(12) United States Patent
Beliveau et al.

(10) Patent No.: US 7,629,067 B2
(45) Date of Patent: Dec. 8, 2009

(54) HYDROGEN-PRODUCING FUEL PROCESSING SYSTEMS AND FUEL CELL SYSTEMS WITH A LIQUID LEAK DETECTION SYSTEM

(75) Inventors: Clint A. Beliveau, Bend, OR (US); Scott C. Elliot, Bend, OR (US); Vernon Wade Popham, Bend, OR (US)

(73) Assignee: Idatech, LLC, Bend, OR (US)

( * ) Notice: Subject to any disclaimer, the term of this patent is extended or adjusted under 35 U.S.C. 154(b) by 24 days.

(21) Appl. No.: 11/750,833

(22) Filed: May 18, 2007

(65) Prior Publication Data

US 2008/0003471 A1  Jan. 3, 2008

Related U.S. Application Data

(60) Provisional application No. 60/802,715, filed on May 22, 2006.

(51) Int. Cl.
*H01M 8/04* (2006.01)
*G01M 3/04* (2006.01)
*G08B 21/00* (2006.01)

(52) U.S. Cl. .............. 429/22; 73/40.5 R; 340/605

(58) Field of Classification Search ............ None
See application file for complete search history.

(56) References Cited

U.S. PATENT DOCUMENTS

| | | |
|---|---|---|
| 2,824,620 A | 2/1958 | De Rosset |
| 3,094,391 A | 6/1963 | Mader |
| 3,144,312 A | 8/1964 | Mertens |
| 3,336,730 A | 8/1967 | McBride et al. |
| 3,338,681 A | 8/1967 | Kordesch |
| 3,350,176 A | 10/1967 | Green et al. |

(Continued)

FOREIGN PATENT DOCUMENTS

EP  1065741 A2  1/2001

(Continued)

OTHER PUBLICATIONS

English-language abstract of Japanese Patent No. 57-145276, 1982.

(Continued)

*Primary Examiner*—Dah-Wei D Yuan
*Assistant Examiner*—Maria J Laios
(74) *Attorney, Agent, or Firm*—Dascenzo Intellectual Property Law, P.C.

(57) ABSTRACT

Liquid leak detection systems, and fuel cell systems and hydrogen-producing fuel processing systems containing the same. The liquid leak detection systems are adapted to detect liquid leaks from the fuel cell and/or fuel processing systems and to respond thereto, such as by interrupting the delivery of liquid reactants, by generating an alert, by transitioning the fuel processing system to a different operating state, and/or by shutting down the fuel processing and/or fuel cell system. The liquid leak detection systems may include a controller and at least one liquid detector, and in some embodiments may include a cover. In some embodiments, the liquid detector includes a signal emitter and a signal detector. In some embodiments, the liquid detector includes at least a pair of spaced-apart conductive members that nominally define an open circuit. In some embodiments, the cover is adapted to repel water and/or includes conductive particulate.

32 Claims, 8 Drawing Sheets

U.S. PATENT DOCUMENTS

| | | |
|---|---|---|
| 3,469,944 A | 9/1969 | Bocard et al. |
| 3,522,019 A | 7/1970 | Buswell et al. |
| 3,655,448 A | 4/1972 | Setzer |
| 3,761,382 A | 9/1973 | Hammond et al. |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,033,133 A | 7/1977 | Houseman et al. |
| 4,071,330 A | 1/1978 | Sederquist |
| 4,079,586 A | 3/1978 | Kincaid, Jr. |
| 4,084,934 A | 4/1978 | Kumazawa |
| 4,098,587 A | 7/1978 | Krar et al. |
| 4,098,588 A | 7/1978 | Buswell et al. |
| 4,098,589 A | 7/1978 | Buswell et al. |
| 4,098,959 A | 7/1978 | Fanciullo |
| 4,098,960 A | 7/1978 | Gagnon |
| 4,134,739 A | 1/1979 | Gulden et al. |
| 4,175,165 A | 11/1979 | Adlhart |
| 4,179,879 A | 12/1979 | Kincaid, Jr. |
| 4,203,950 A | 5/1980 | Sederquist |
| 4,214,969 A | 7/1980 | Lawrance |
| 4,238,403 A | 12/1980 | Pinto |
| 4,278,445 A | 7/1981 | Stickler et al. |
| 4,278,446 A | 7/1981 | Von Rosenberg, Jr. et al. |
| 4,292,274 A | 9/1981 | Faitani et al. |
| 4,302,177 A | 11/1981 | Fankhanel et al. |
| 4,331,520 A | 5/1982 | Juda et al. |
| 4,389,326 A | 6/1983 | Tanguy et al. |
| 4,400,182 A | 8/1983 | Davies et al. |
| 4,408,572 A | 10/1983 | Yoon et al. |
| 4,430,304 A | 2/1984 | Spurrier et al. |
| 4,444,158 A | 4/1984 | Yoon |
| 4,468,235 A | 8/1984 | Hill |
| 4,473,622 A | 9/1984 | Chludzinski et al. |
| 4,476,674 A | 10/1984 | Berman |
| 4,504,447 A | 3/1985 | Spurrier et al. |
| 4,506,631 A | 3/1985 | Phong-Anant |
| 4,509,915 A | 4/1985 | Ito |
| 4,533,607 A | 8/1985 | Sederquist |
| 4,567,857 A | 2/1986 | Houseman et al. |
| 4,642,273 A | 2/1987 | Sasaki |
| 4,657,828 A | 4/1987 | Tajima |
| 4,659,634 A | 4/1987 | Struthers |
| 4,670,359 A | 6/1987 | Beshty et al. |
| 4,687,491 A | 8/1987 | Latty |
| 4,692,306 A | 9/1987 | Minet |
| 4,699,637 A | 10/1987 | Iniotakis et al. |
| 4,788,004 A | 11/1988 | Pinto et al. |
| 4,820,594 A | 4/1989 | Sugita et al. |
| 4,838,897 A | 6/1989 | Amano et al. |
| 4,849,187 A | 7/1989 | Uozu et al. |
| 4,877,923 A * | 10/1989 | Sahakian ............... 174/11 R |
| 4,926,165 A * | 5/1990 | Lahlouh et al. ............. 340/603 |
| 4,981,676 A | 1/1991 | Minet et al. |
| 4,988,286 A | 1/1991 | Hersh |
| 5,198,312 A | 3/1993 | Irino et al. |
| 5,226,928 A | 7/1993 | Makabe et al. |
| 5,229,102 A | 7/1993 | Minet et al. |
| 5,401,589 A | 3/1995 | Palmer et al. |
| RE35,002 E | 7/1995 | Matsubara et al. |
| 5,432,710 A | 7/1995 | Ishimaru et al. |
| 5,458,857 A | 10/1995 | Collins et al. |
| 5,470,360 A | 11/1995 | Sederquist |
| 5,516,344 A | 5/1996 | Corrigan |
| 5,616,430 A | 4/1997 | Aoyama |
| 5,628,931 A | 5/1997 | Lednor et al. |
| 5,637,414 A | 6/1997 | Inoue et al. |
| 5,639,431 A | 6/1997 | Shirasaki et al. |
| 5,714,276 A | 2/1998 | Okamoto |
| 5,729,967 A | 3/1998 | Joos et al. |
| 5,744,067 A | 4/1998 | Jahnke |
| 5,780,179 A | 7/1998 | Okamoto |
| 5,798,186 A | 8/1998 | Fletcher et al. |
| 5,811,065 A | 9/1998 | Sterenberg |
| 5,833,723 A | 11/1998 | Kuwabara et al. |
| 5,851,689 A | 12/1998 | Chen |
| 5,861,137 A | 1/1999 | Edlund |
| 5,932,141 A | 8/1999 | Rostrop-Nielsen et al. |
| 5,938,800 A | 8/1999 | Verrill et al. |
| 5,997,594 A | 12/1999 | Edlund et al. |
| 5,998,053 A | 12/1999 | Diethelm |
| 6,042,956 A | 3/2000 | Lenel |
| 6,045,772 A | 4/2000 | Szydlowski et al. |
| 6,045,933 A | 4/2000 | Okamoto |
| 6,077,620 A | 6/2000 | Pettit |
| 6,083,637 A | 7/2000 | Walz et al. |
| 6,103,411 A | 8/2000 | Matsubayashi et al. |
| 6,123,873 A | 9/2000 | Primdahl |
| 6,124,053 A | 9/2000 | Bernard et al. |
| 6,152,995 A | 11/2000 | Edlund |
| 6,165,633 A | 12/2000 | Negishi |
| 6,180,272 B1 | 1/2001 | Byrne et al. |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,242,120 B1 | 6/2001 | Herron |
| 6,274,258 B1 | 8/2001 | Chen |
| 6,296,814 B1 | 10/2001 | Bonk et al. |
| 6,319,306 B1 | 11/2001 | Edlund et al. |
| 6,328,945 B1 | 12/2001 | Hufton et al. |
| 6,365,290 B1 | 4/2002 | Ghezel-Ayagh et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,419,728 B1 | 7/2002 | Edlund |
| 6,451,464 B1 | 9/2002 | Edlund et al. |
| 6,458,189 B1 | 10/2002 | Edlund et al. |
| 6,461,408 B2 | 10/2002 | Buxbaum |
| 6,465,118 B1 | 10/2002 | Dickman et al. |
| 6,472,092 B1 | 10/2002 | Matsuda et al. |
| 6,494,937 B1 | 12/2002 | Edlund et al. |
| 6,495,277 B1 | 12/2002 | Edlund et al. |
| 6,521,204 B1 | 2/2003 | Borup et al. |
| 6,537,352 B2 | 3/2003 | Edlund et al. |
| 6,562,111 B2 | 5/2003 | Edlund et al. |
| 6,608,463 B1 | 8/2003 | Kelly et al. |
| 6,609,582 B1 | 8/2003 | Botti et al. |
| 6,632,270 B2 | 10/2003 | Edlund et al. |
| 6,656,617 B2 * | 12/2003 | Aoyama et al. ............... 429/19 |
| 6,669,463 B2 | 12/2003 | Beutel et al. |
| 6,692,853 B2 | 2/2004 | Hanai et al. |
| 6,719,831 B2 | 4/2004 | Edlund et al. |
| 6,723,156 B2 | 4/2004 | Edlund et al. |
| 6,805,553 B2 | 10/2004 | Hermann et al. |
| 6,808,837 B2 | 10/2004 | Hirsch |
| 6,824,593 B2 | 11/2004 | Edlund et al. |
| 6,869,456 B2 | 3/2005 | Salemi et al. |
| 6,869,707 B2 | 3/2005 | Edlund et al. |
| 2002/0108309 A1 | 8/2002 | Grieve et al. |
| 2002/0110507 A1 | 8/2002 | Grieve et al. |
| 2002/0122966 A1* | 9/2002 | Acker et al. ................. 429/24 |
| 2002/0124836 A1 | 9/2002 | Reddy |
| 2003/0039871 A1 | 2/2003 | Christen et al. |
| 2003/0082419 A1 | 5/2003 | Berlowitz et al. |
| 2003/0200699 A1 | 10/2003 | Robb |
| 2003/0223926 A1 | 12/2003 | Edlund et al. |
| 2003/0234123 A1 | 12/2003 | Schumann et al. |
| 2004/0043263 A1* | 3/2004 | Takeyama et al. ............ 429/19 |
| 2004/0105795 A1 | 6/2004 | Gough |
| 2004/0121202 A1 | 6/2004 | Varadaraj et al. |
| 2004/0121203 A1 | 6/2004 | Varadaraj et al. |

| | | | |
|---|---|---|---|
| 2004/0126643 A1 | 7/2004 | Kinkelaar et al. | |
| 2004/0155065 A1 | 8/2004 | Kinkelaar et al. | |
| 2004/0161642 A1* | 8/2004 | Hisano et al. | 429/12 |
| 2004/0234828 A1* | 11/2004 | Ozeki | 429/22 |
| 2005/0008909 A1 | 1/2005 | Kaye et al. | |
| 2005/0019623 A1 | 1/2005 | Shoji et al. | |
| 2005/0074644 A1* | 4/2005 | Ueda et al. | 429/22 |
| 2006/0272212 A1 | 12/2006 | Edlund | |
| 2007/0193342 A1* | 8/2007 | Bailey et al. | 73/53.01 |

FOREIGN PATENT DOCUMENTS

| | | |
|---|---|---|
| JP | 57-145276 | 9/1982 |
| JP | 4-338101 | 11/1992 |
| WO | WO 99/65097 | 12/1999 |

OTHER PUBLICATIONS

English-language abstract of Japanese Patent No. 4-338101, 1992.
English-language abstract of Japanese Patent No. 5132301, 1993.
English-language abstract of Japanese Patent No. 5147902, 1993.
English-language abstract of Japanese Patent No. 710910, 1995.
English-language abstract of Japanese Patent No. 8287932, 1996.
English-language abstract of Great Britain Patent No. 2,305,186, 1997.
Fig. 1 of Taiwan Patent Publication No. 301473, undated, which was cited in a communication received Jul. 21, 2004 from a foreign patent office.
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).

* cited by examiner

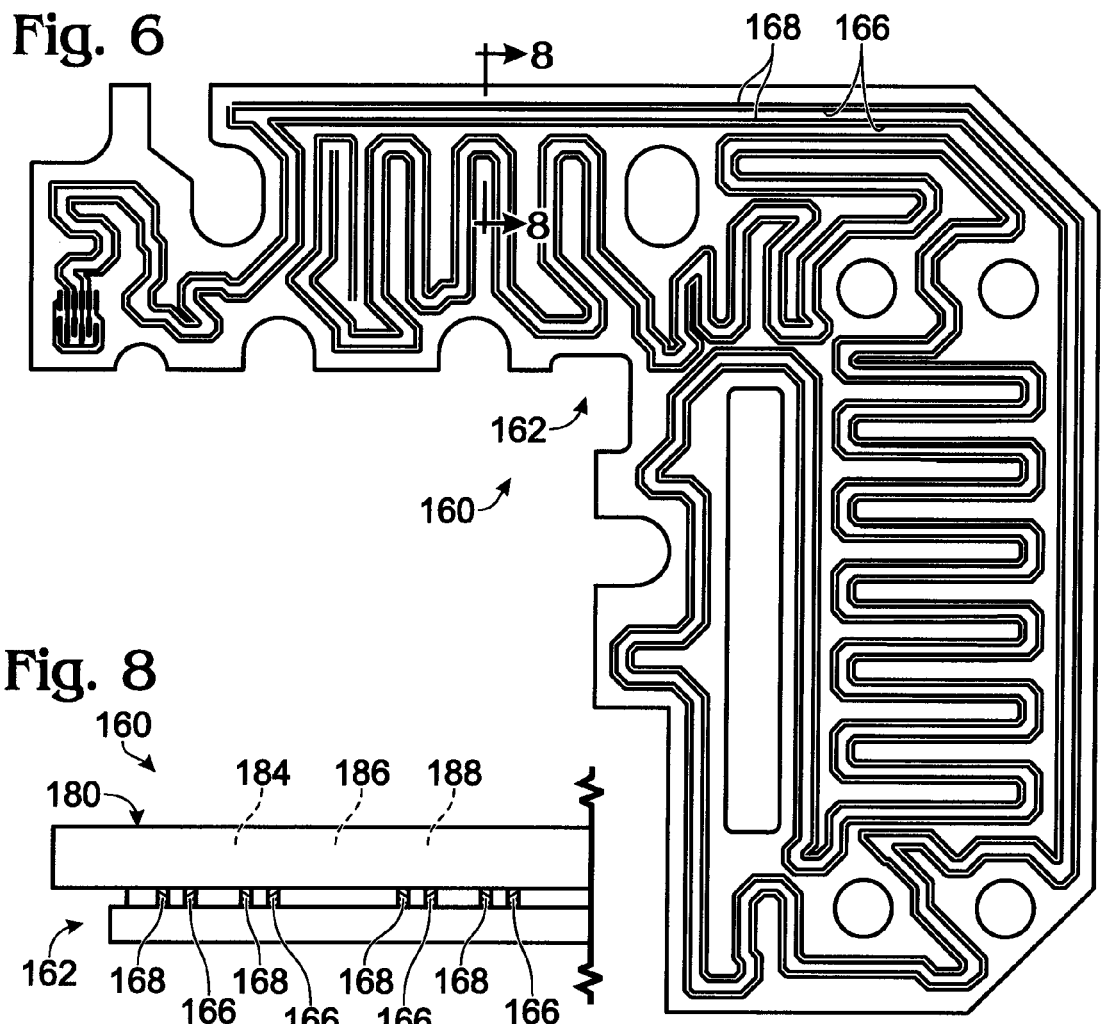
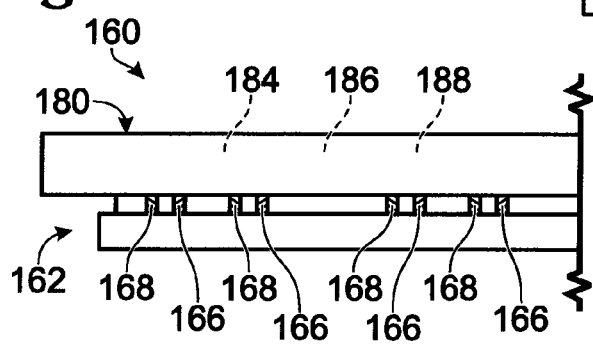
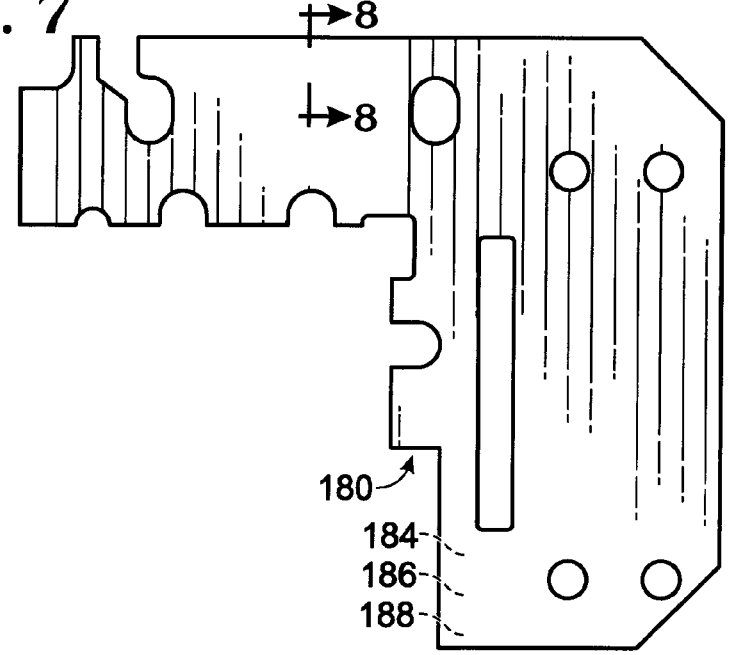

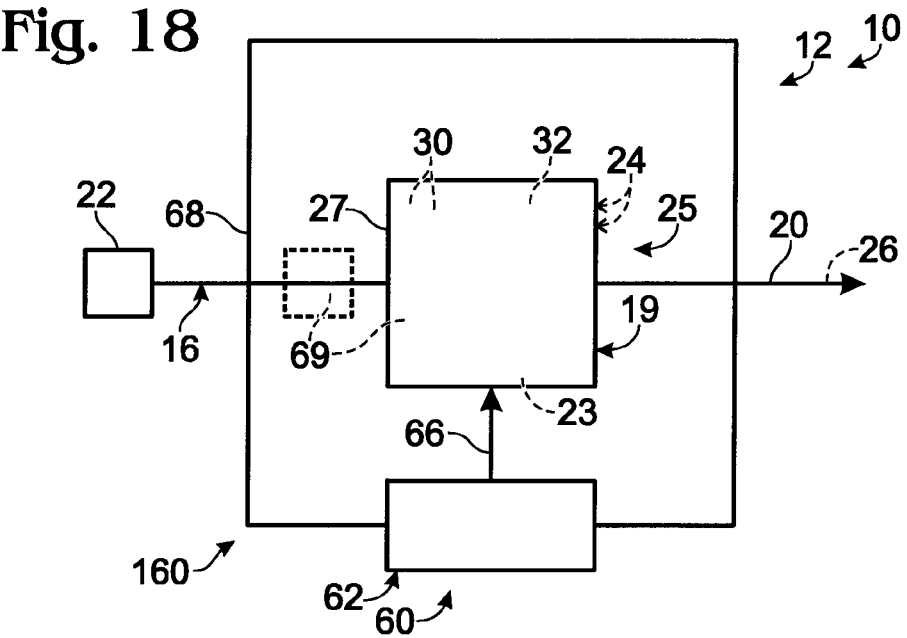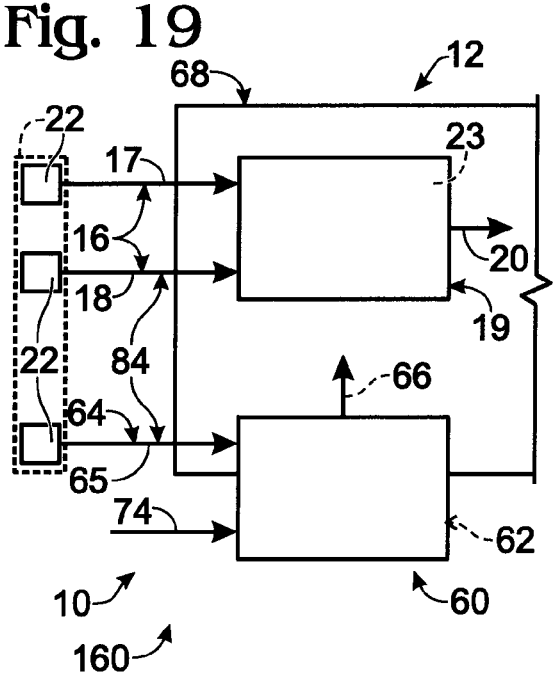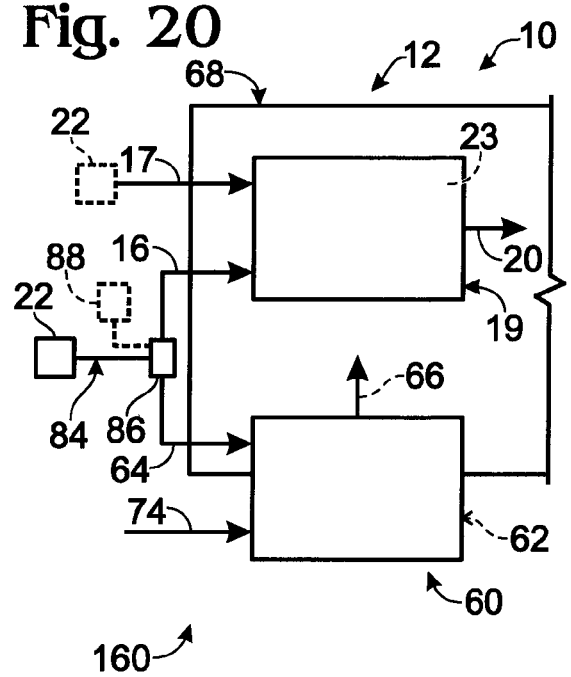

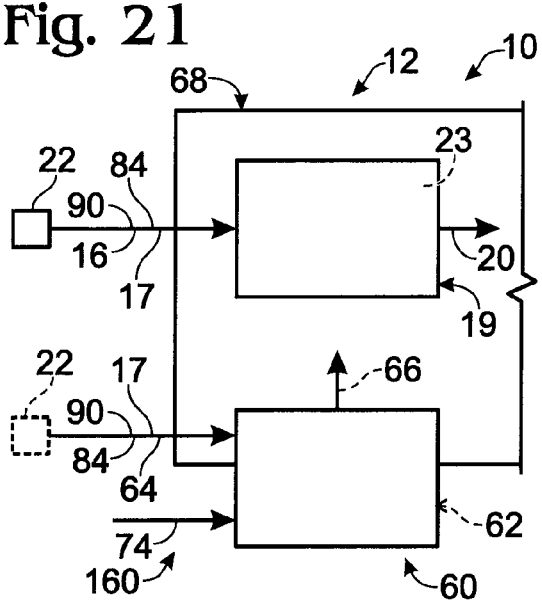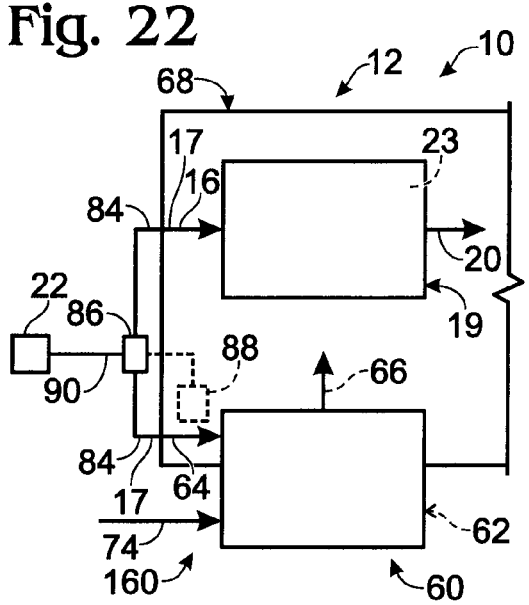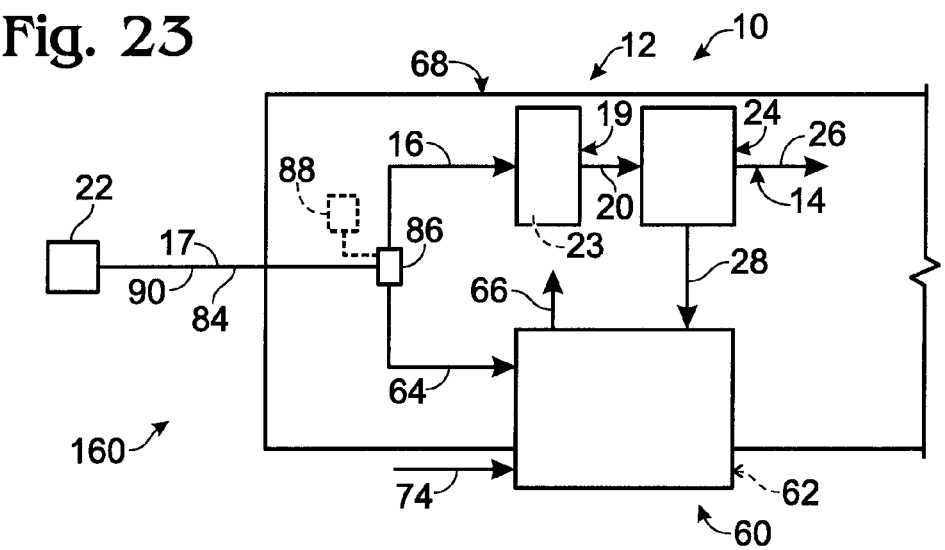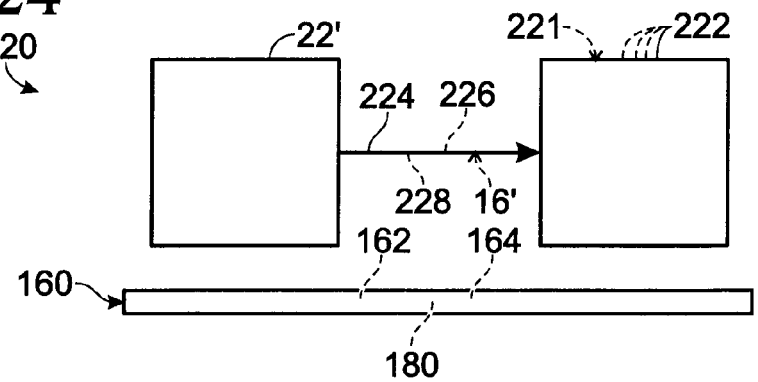

HYDROGEN-PRODUCING FUEL PROCESSING SYSTEMS AND FUEL CELL SYSTEMS WITH A LIQUID LEAK DETECTION SYSTEM

RELATED APPLICATION

The present disclosure claims priority under 35 U.S.C. § 119(e) to U.S. Provisional Patent Application Ser. No. 60/802,715, which was filed on May 22, 2006 and the entire disclosure of which is herein incorporated by reference for all purposes.

FIELD OF THE DISCLOSURE

The present disclosure relates generally to liquid leak detection systems, and to fuel cell systems and hydrogen-producing fuel processing systems that include a liquid leak detection system.

BACKGROUND OF THE DISCLOSURE

Hydrogen-producing fuel processing systems are adapted to produce, via chemical reaction, a product stream containing hydrogen gas as a majority component from at least one feedstock. Many such fuel processing systems are adapted to produce hydrogen gas from at least one liquid carbon-containing feedstock. In some fuel processing systems, more than one carbon-containing feedstock is utilized. In some fuel processing systems, water is also utilized as a feedstock. In some fuel processing systems, the one or more feedstocks are vaporized prior to being chemically reacted, or reformed, to produce the hydrogen-rich product stream.

The liquid carbon-containing feedstock is often an alcohol or hydrocarbon and is generally flammable. The liquid carbon-containing feedstock, either alone or in combination with water, is typically pumped or otherwise transported from a fuel supply or fuel source to regions of the fuel processing system where it is consumed. In some embodiments, the feedstock is consumed as a fuel for a burner or other heating assembly in addition to being used as a reactant for the production of hydrogen gas. Typically liquid (or other fluid) transport tubing provides conduits through which the feedstock flows. It is possible for leaks to occasionally occur, such as from the tubing, from couplings for the tubing, from couplings between other components of the fuel processing system, etc. Timely detection of such a leak, should it occur, is therefore desirable, especially in the context of flammable liquid carbon-containing feedstocks.

BRIEF DESCRIPTION OF THE DRAWINGS

FIG. 6 is a top plan view of an illustrative example of a liquid detector that may be used in leak detection systems according to the present disclosure.

FIG. 7 is a top plan view of an illustrative example of a cover that may be used in leak detection systems according to the present disclosure.

FIG. 8 is a fragmentary cross-sectional view of a liquid leak detection system that includes the liquid detector of FIG. 6 and the cover of FIG. 7, taken along lines 8-8 in FIGS. 6 and 7.

FIG. 18 is a schematic view of another example of a fuel processing system that may be used with liquid leak detection systems according to the present disclosure.

FIG. 19 is a schematic view of a fuel processing system according to the present disclosure in which the hydrogen-producing region and the feedstock delivery system both receive the same liquid carbon-containing feedstock.

FIG. 20 is a schematic view showing a variation of the fuel processing system of FIG. 19, with a carbon-containing liquid feedstock being delivered to the hydrogen-producing region and the burner assembly from the same supply stream.

FIG. 21 is a schematic view of a fuel processing system according to the present disclosure in which the hydrogen-producing region and the burner assembly both receive fuel, or feed, streams containing water and a liquid carbon-containing feedstock.

FIG. 22 is a schematic view showing a variation of the fuel processing system of FIG. 21, with the hydrogen-producing region and the burner assembly both receiving fuel, or feed, streams containing water and a liquid carbon-containing feedstock from the same supply stream.

FIG. 23 is a schematic view showing another variation of the fuel processing systems of FIGS. 21 and 22.

FIG. 24 is a schematic view of a liquid leak detection system according to the present disclosure being used with a direct methanol fuel cell stack and/or direct methanol fuel cell system.

DETAILED DESCRIPTION AND BEST MODE OF THE DISCLOSURE

Figure 1:
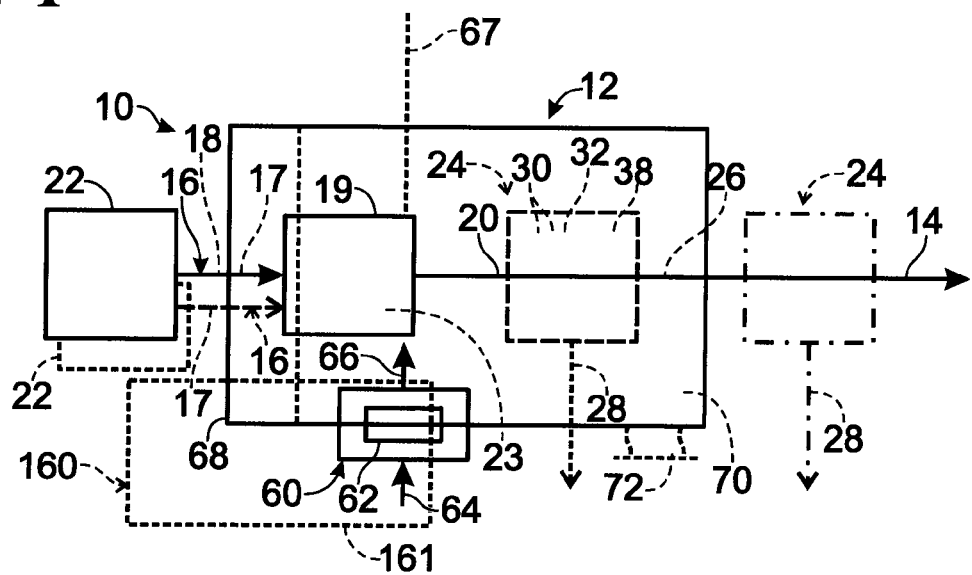
FIG. 1 is a schematic diagram of a hydrogen-generating fuel processing system with a liquid leak detection system according to the present disclosure.

A fuel processing system containing a liquid leak detection system according to the present disclosure is shown in FIG. 1 and is indicated generally at 10. Fuel processing system 10 includes a fuel processor 12 that is adapted to produce a product hydrogen stream 14 containing hydrogen gas, and preferably at least substantially pure hydrogen gas, from one or more feed streams 16. Accordingly, fuel processing system 10 may be referred to as a hydrogen-generating fuel processing system, a hydrogen-producing fuel processing assembly, and/or a hydrogen generation assembly. Feed stream 16 may include at least one liquid carbon-containing feedstock 18. Fuel processor 12 includes any suitable device, or combination of devices, that is adapted to produce hydrogen gas from feed stream(s) 16, typically after vaporization of the feed stream(s). Accordingly, fuel processor 12 may be referred to as a fuel processing assembly and includes a hydrogen-producing region 19, in which an output stream 20 containing hydrogen gas is produced by utilizing any suitable hydrogen-producing mechanism(s). Output stream 20 includes hydrogen gas as at least a majority component. Output stream 20 may include one or more additional gaseous components, and thereby may be referred to as a mixed gas stream that contains hydrogen gas as its majority component.

The fuel processing assembly is adapted to receive one or more feed streams 16 from a feedstock delivery system 22. Feedstock delivery system 22 is adapted to draw or otherwise receive a liquid carbon-containing feedstock from a supply, or source, that contains the liquid carbon-containing feedstock and to deliver a feed stream 16 containing the feedstock for use in at least the hydrogen-producing region of the fuel processing assembly. In some embodiments, the feed stream and/or liquid carbon-containing feedstock may also be consumed as a fuel for a heating assembly that combusts the feedstock in the presence of air to heat at least the hydrogen-producing region of the fuel processing assembly. Feedstock delivery system 22 may utilize any suitable delivery mechanism, such as a positive displacement or other suitable pump or mechanism for propelling liquid fluid streams. When one or more pumps are used, the number, type and capacity of the pumps may vary, such as with respect to the desired flow rate of liquid to be pumped thereby, the desired pressure to be provided to the liquid, the composition of the liquid, whether or not the flow rate is intended to be selectively varied, etc. Illustrative, non-exclusive examples of pumps that may be used include diaphragm pumps, metering pumps, gear pumps, and the like. In some embodiments, the feed stream may be received from a pressurized source, and in some such embodiments, an additional pump may not be required downstream from the source. Illustrative, non-exclusive examples of suitable feedstock delivery systems are disclosed in U.S. Published Patent Application No. 2007/0062116, the complete disclosure of which is hereby incorporated by reference for all purposes.

Examples of suitable mechanisms for producing hydrogen gas from feed stream(s) 16 delivered by feedstock delivery system 22 include steam reforming and autothermal reforming, in which reforming catalysts are used to produce hydrogen gas from a feed stream 16 containing a liquid carbon-containing feedstock 18 and water 17. Other suitable mechanisms for producing hydrogen gas include pyrolysis and catalytic partial oxidation of a carbon-containing feedstock, in which case the feed stream does not (or does not need to) contain water. Illustrative, non-exclusive examples of suitable carbon-containing feedstocks 18 include at least one hydrocarbon or alcohol. Illustrative, non-exclusive examples of suitable liquid hydrocarbons include diesel, kerosene, gasoline and the like. Illustrative, non-exclusive examples of suitable alcohols include methanol, ethanol, and polyols, such as ethylene glycol and propylene glycol.

While a single feed stream 16 is shown in FIG. 1, it is within the scope of the disclosure that more than one feed stream 16 may be used and that these streams may contain the same or different feedstocks. This is schematically illustrated by the inclusion of a second feed stream 16 in dashed lines in FIG. 1. Similarly, FIG. 1 also illustrates in dashed lines that that each feed stream 16 may (but is not required to) be associated with a different feedstock delivery system 22, or portions thereof. For example, when more than one feedstock delivery system 22 is utilized, the systems may (but are not required to) draw at least a portion of their outlet streams from a common supply. When feed stream 16 contains two or more components, such as a liquid carbon-containing feedstock and water, the components may be delivered in the same or different feed streams. For example, when the fuel processor is adapted to produce hydrogen gas from a carbon-containing feedstock and water that are delivered to the hydrogen generation assembly as a liquid feed stream, these components are typically delivered in separate streams, and optionally (at least until both streams are vaporized or otherwise gaseous) when they are not miscible with each other, such as shown in FIG. 1 by reference numerals 17 and 18 pointing to different feed streams.

When the liquid carbon-containing feedstock is miscible with (liquid) water, the feedstock is typically, but is not required to be, delivered with the water component of feed stream 16, such as shown in FIG. 1 by reference numerals 17 and 18 pointing to the same feed stream 16. For example, when the fuel processor receives a feed stream containing (liquid) water and a water-soluble alcohol, such as methanol, these components may be premixed and delivered as a single stream. For example, a reforming feed stream may contain approximately 25-75 vol % methanol or ethanol or another suitable water-miscible carbon-containing feedstock, and approximately 25-75 vol % water. For hydrogen-producing fuel processing assembly feed streams that are formed (at least substantially) of methanol and water, the streams will often contain approximately 50-75 vol % methanol and approximately 25-50 vol % water. Streams containing ethanol or other water-miscible alcohols will often contain approximately 25-60 vol % alcohol and approximately 40-75 vol % water. An example of a particularly well-suited feed stream for hydrogen-generating assemblies that utilize steam reforming or autothermal reforming reactions contains 69 vol % methanol and 31 vol % water, although other compositions and liquid carbon-containing feedstocks may be used without departing from the scope of the present disclosure. While not required, it is within the scope of the present disclosure that such a feed stream that contains both (liquid) water and at least one liquid carbon-containing feedstock may be used as the feed stream for hydrogen-producing region 19 and as a combustible fuel stream for a heating assembly that is adapted to heat at least the hydrogen-producing region of the fuel processing assembly.

Steam reforming is one non-exclusive example of a hydrogen-producing mechanism that may be employed in hydrogen-producing region 19 in which feed stream 16 comprises water and a carbon-containing feedstock. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing a steam reforming hydrogen-producing mechanism. Illustrative, non-exclusive examples of suitable steam reforming catalysts for steam reforming of methanol include copper-zinc formulations of low temperature shift catalysts and a chromium formulation sold under the trade name KMA by Süd-Chemie, although others may be used. Further illustrative, non-exclusive examples are disclosed in U.S. Published Patent Application No. 2006/0236607, the complete disclosure of which is hereby incorporated by reference. The other gases that are often present in the reformate stream include carbon monoxide, carbon dioxide, methane, steam, and/or unreacted carbon-containing feedstock.

Another illustrative, non-exclusive example of a suitable hydrogen-producing reaction that may be utilized in hydrogen-producing region 19 is autothermal reforming, in which a suitable autothermal reforming catalyst is used to produce hydrogen gas from water and a carbon-containing feedstock in the presence of air. When autothermal reforming is used, the fuel processor further includes an air delivery assembly 67 that is adapted to deliver an air stream to the hydrogen-producing region, as indicated in dashed lines in FIG. 1. Autothermal hydrogen-producing reactions utilize a primary endothermic reaction that is utilized in conjunction with an exothermic partial oxidation reaction, which generates heat within the hydrogen-producing region upon initiation of the initial hydrogen-producing reaction.

As an illustrative example of temperatures that may be achieved and/or maintained in hydrogen-producing region 19 through the use of a heating assembly 60, hydrogen-producing steam reformers typically operate at temperatures in the range of 200° C. and 900° C. Temperatures outside of this range are within the scope of the disclosure. Steam and autothermal reformers also tend to operate at elevated pressures, such as pressures in the range of 50 and 1000 psi, although pressures outside of this range may be used and are within the scope of the present disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the hydrogen-production fluid includes a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen-producing regions and/or as including two of more hydrogen-producing regions that are connected in series, with the output stream from the first region forming at least a portion of the feed stream for the second hydrogen-producing region. Illustrative, non-exclusive examples of suitable heating assemblies for use with fuel processing assemblies according to the present disclosure are disclosed in U.S. Published Patent Application Ser. Nos. 2003/0192251, 2003/0223926, and 2006/0272212, the complete disclosures of which are hereby incorporated by reference for all purposes.

In FIG. 1, fuel processor 12 is shown including a shell 68 in which at least the hydrogen-producing region, and optionally at least one of the subsequently discussed purification regions, is contained. Shell 68, which also may be referred to as a housing, enables the components of the steam reformer or other fuel processor to be moved as a unit. It also protects the components of fuel processor 12 from damage by providing a protective enclosure and reduces the heating demand of the fuel processing assembly because the components of the fuel processor may be heated as a unit. Shell 68 may, but does not necessarily, include insulating material 70, such as a solid insulating material, blanket insulating material, and/or an air-filled cavity. It is within the scope of the disclosure, however, that the fuel processor may be formed without a housing or shell. When fuel processor 12 includes insulating material 70, the insulating material may be internal the shell, external the shell, or both. When the insulating material is external a shell containing the above-described reforming and/or subsequently-described purification region(s), fuel processor 12 further may include an outer cover or jacket 72 external the insulation, as schematically illustrated in FIG. 1. It is within the scope of the present disclosure that the fuel processing assembly may be implemented with a different shell, with a shell that includes additional components of the fuel processing assembly, including feedstock delivery system 22 (or portions thereof), and/or includes additional components of the fuel cell system. It is also within the scope of the present disclosure that a fuel processing assembly 10 may not include a shell 68.

As also shown in FIG. 1, fuel processing systems (and fuel cell systems) according to the present disclosure may include a heating assembly 60 that is adapted to heat at least the hydrogen-producing region, or reforming region, 19 of the fuel processor. In some fuel processing systems according to the present disclosure, heating assembly 60 includes a burner assembly 62 and may be referred to as a combustion-based, or combustion-driven, heating assembly. In a combustion-based heating assembly, the heating assembly 60 is adapted to receive at least one fuel stream 64 and to combust the fuel stream in the presence of air to provide a hot combustion stream 66 that may be used to heat at least the hydrogen-producing region 19 of the fuel processor. Stream 66 may also be referred to as a heated exhaust stream. As discussed in more detail herein, air may be delivered to the heating assembly via a variety of mechanisms.

It is within the scope of the disclosure that combustion stream 66 may additionally or alternatively be used to heat other portions of the fuel processing system and/or fuel cell system with which heating assembly 60 is used. It is also within the scope of the present disclosure that other configurations and types of heating assemblies 60 may be utilized. As an illustrative further example, a heating assembly 60 may be an electrically powered heating assembly that is adapted to heat at least the hydrogen-producing region of the fuel processing assembly by generating heat using at least one heating element, such as a resistive heating element. Therefore, it is not required that heating assembly 60 receive and combust a combustible fuel stream to heat hydrogen-producing region 19 to a suitable hydrogen-producing temperature.

In FIG. 1, heating assembly 60 is schematically illustrated in an overlapping relationship with fuel processor 12 to graphically represent that it is within the scope of the disclosure that the heating assembly may be located partially or completely within fuel processor 12, such as being at least partially within shell 68, and/or that at least a portion, or all, of the heating assembly may be located external the fuel processor. In this latter embodiment, the hot combustion gases from the burner assembly will be delivered via suitable heat transfer conduits to the fuel processor or other portion of the system(s) to be heated.

Fuel processing systems 10 according to the present disclosure also include a liquid leak detection system 160 that is adapted to detect liquid that leaks from components of the fuel processing system. As illustrative, non-exclusive examples, the liquid leak detection system may be positioned or otherwise configured to detect liquid leaks from one or more of feedstock delivery system 22, heating assembly 60, and various fluid delivery conduits through which the liquid feedstocks and/or fuels travel within the fuel processing system. An illustrative, non-exclusive example of these fluid delivery conduits, or fluid conduits, is one or more feed conduits that extend between the feedstock delivery system and the hydrogen-producing assembly and/or hydrogen-producing region thereof, and through which the feed stream containing at least a carbon-containing feedstock flows during use of the fuel processing system to produce hydrogen gas from the feed stream. As another illustrative, non-exclusive example, these fluid conduits may include at least one fuel conduit that extends between a fuel source, such as from feedstock delivery system, and a heating assembly that is adapted to receive and combust a liquid fuel, and through which the liquid fuel flows to the heating assembly when the heating assembly is combusting liquid fuel to produce a heated exhaust stream. In some embodiments, the liquid leak detection system also may be referred to as a liquid spill detection system.

Liquid leak detection system 160 is adapted to detect liquid that leaks or otherwise is emitted to, or present in, regions of the fuel processing system (including any associated housing, shell, support surface, or other enclosure) where the liquid should not be present during proper operation of the fuel processing system. In other words, the liquid leak detection system is configured to detect liquid in or adjacent regions of the fuel processing system where liquid is not present during proper, or desired, operation of the fuel processing system. In some embodiments, the liquid leak detection system may be adapted to detect any liquid. In some embodiments, the liquid leak detection system may be configured to detect certain liquids and/or liquids with certain properties. In such an embodiment, the liquid leak detection system may accordingly be configured to detect certain liquids while not detecting (and/or being actuated by) other liquids.

Upon detection of liquid (or in some embodiments, a liquid with a predetermined property), the liquid leak detection system, and/or an associated control system in communication with the detection system, may be configured to at least one of stop or otherwise interrupt the operation of the fuel processing system, generate an alert signal, and/or transition (and/or cause the transitioning of) the fuel processing system to a different operating state. Interrupting the operation of the fuel processing system may include one or more of such illustrative, non-exclusive steps of stopping the delivery of one or more feedstocks to the hydrogen-producing region, stopping the delivery of one or all feed streams to the hydrogen-producing region, stopping the operation of the feedstock delivery system, stopping the delivery of fuel and/or power to the heating assembly, shutting down the fuel processing system, etc. Generating an alert signal may include generating at least one audible, visible, and/or electronic alert signal. For example, a siren or indicator light may be used as audible and visible signals, while an electronic alert signal may be sent, for example, to a remote location to indicate, or otherwise provide notification of, the detected leak. Transitioning the fuel processing system to a different operating state may include transitioning to an idle or faulted operating state in which no, or only minimal, hydrogen gas is produced by the fuel processing assembly. In an idle operating state, the fuel processor may be maintained at suitable temperatures and pressures for producing hydrogen gas, whereas in a faulted operating state the fuel processor may be cooled and/or depressurized to a temperature and/or pressure that is less than minimum hydrogen-producing temperatures and/or pressures. Illustrative examples of suitable operating states, and related fuel processing systems and control systems, are disclosed in U.S. Pat. Nos. 6,495,277 and 6,383,670, the complete disclosures of which are hereby incorporated by reference for all purposes. The above illustrative examples of responses to the detection of a liquid leak by detection system 160 are intended to provide illustrative, non-exclusive examples. It is within the scope of the present disclosure that other responses may be utilized, either in place of or in addition to one or more of the above-presented examples.

In FIG. 1, liquid leak detection system 160 is schematically illustrated as extending beneath at least a portion of the fluid conduits through which the liquid feedstock(s) from feedstock delivery system 22 flow. As schematically illustrated, these conduits may extend generally between the feedstock delivery system and hydrogen-producing region 19, and when a liquid fuel stream is combusted by heating assembly 60, between feedstock delivery system 22 and heating assembly 60. When positioned beneath one or more portions of the fuel processing system, the liquid leak detection system may be supported on a base or other structure, such as schematically illustrated in FIG. 1 at 161, that also supports at least the associated portions of the fuel processing assembly, but this is not required. This base, or support, is schematically illustrated in FIG. 1 at 161.

Figure 2:
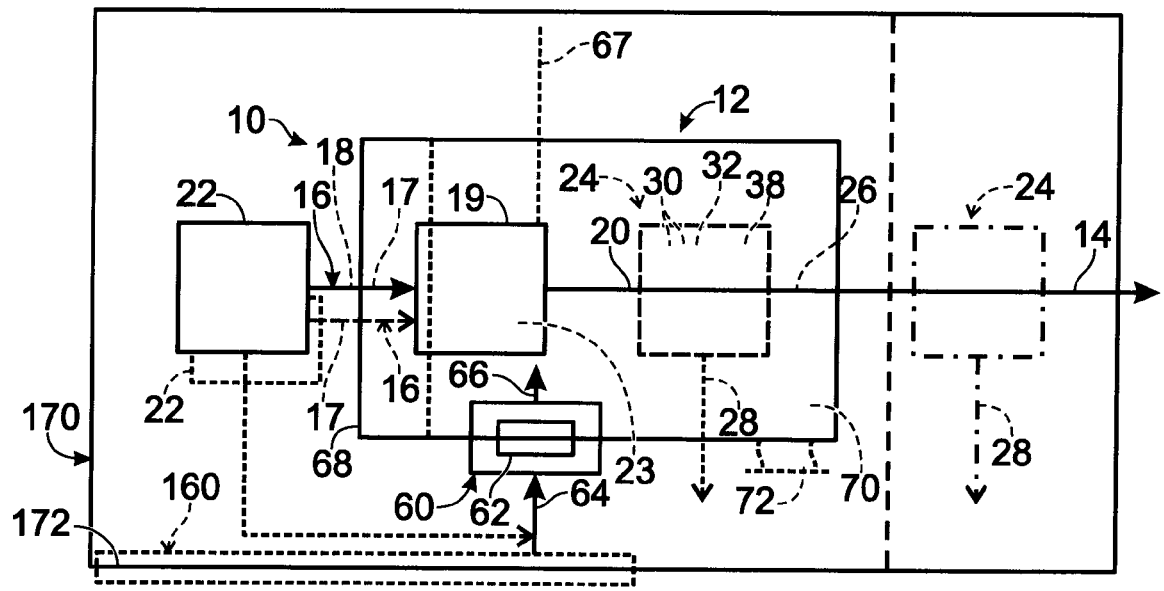
FIG. 2 is a schematic diagram showing another illustrative example of a liquid leak detection system according to the present disclosure.

In FIG. 2, the fuel processing system is shown with a housing 170 having a base, or lower region, 172, with the liquid leak detection system being positioned proximate the base. By "proximate the base," it is meant that the liquid leak detection system may be integrated into the base, positioned beneath the base (such as if the base includes vents or other apertures through which leaked or spilled liquid may leak, and/or supported upon the base within the housing. In FIG. 2, heating assembly 60 and feedstock delivery system 22 are shown positioned within housing 170. This is not required to all embodiments according to the present disclosure. Similarly, it is within the scope of the present disclosure that the fuel processing system may include more than one liquid leak detection system, such as by having redundant, or backup, systems and/or having separate systems associated with different portions, or regions, of the fuel processing assembly.

Figure 3:
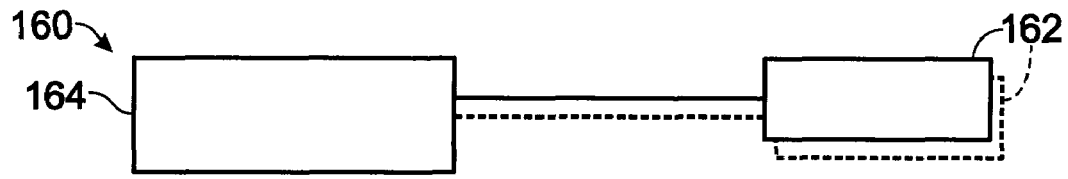
FIG. 3 is a schematic diagram showing another illustrative example of a liquid leak detection system according to the present disclosure.

In FIG. 3, an illustrative, non-exclusive example of a suitable construction for a liquid leak detection system 160 according to the present disclosure is schematically illustrated.

In FIG. 3, liquid leak detection system 160 includes at least one liquid sensor, or detector, 162 that is in communication with a controller 164. Controller 164 may be, or include, a dedicated controller, logic circuit, computer-implemented algorithm, or processor, that is associated with the liquid leak detection system, or it may be integrated with, or in communication with, another controller or control system that is configured to regulate or control other aspects of the fuel processing system. Liquid sensor 162 may be adapted to detect any suitable property or condition that is indicative of liquid being present in a region of the fuel processing system where liquid should not be present during proper operation of the fuel processing system. In some embodiments, this detecting may be described as electrically detecting any suitable property or condition that is indicative of liquid being present in a region of the fuel processing system where liquid should not be present during proper operation of the fuel processing system. In some embodiments, the detection system will include two or more sensors, as schematically indicated in dashed lines in FIG. 3. Liquid leak detection systems 160, according to the present disclosure, including components of such systems, may be powered by any suitable power source. In some embodiments, the power source, or power supply, may be integrated or otherwise housed with a particular component (such as a controller and/or liquid detector), while in others it may be in electrical communication therewith to provide power thereto.

Figure 4:
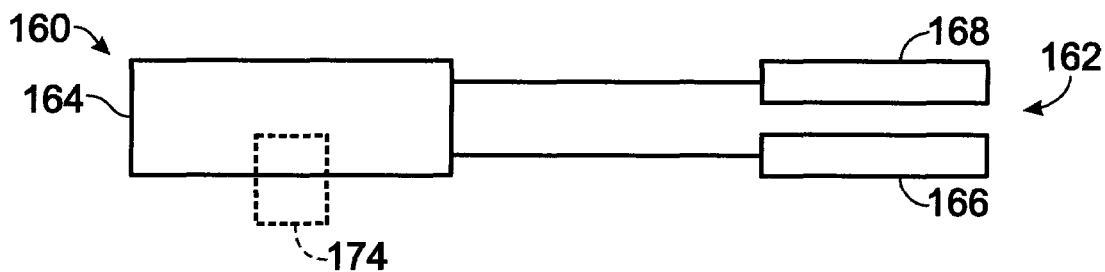
FIG. 4 is a schematic diagram showing another illustrative example of a liquid leak detection system according to the present disclosure.

In FIG. 4, another illustrative, non-exclusive example of a suitable construction for a liquid leak detection system 160 according to the present disclosure is schematically illustrated. In FIG. 4, liquid leak detection system 160 includes a liquid detector 162 that includes a signal emitter 166 and a signal detector 168. Signal emitter 166 is adapted to emit a signal, which signal detector 168 is adapted to detect and/or monitor, such as to detect a portion of the emitted signal and/or a change in the emitted signal that is indicative of a liquid leak. As an illustrative, non-exclusive example, the signal emitter may be configured to emit a signal when a liquid leak is detected, and the signal detector may be configured to detect when such a signal is emitted by the signal emitter. As another illustrative, non-exclusive example, signal detector 168 may be adapted to monitor the emitted signal to detect if the signal changes in a selected, or leak-indicating, manner, such as by increasing or decreasing by a predetermined amount, or to a predetermined level, that is indicative of a liquid leak, and more particularly, by a liquid contacting the signal emitter. Additionally or alternatively, signal detector 168 may be adapted to compare any detected signal to a threshold value.

If the detected signal has a predetermined relationship to the threshold value that is indicative of a liquid leak, such as with the detected signal being equal to, greater than, at least as great as, less than, or not greater than, the threshold value, then the detection system may cause a predetermined response, such as one or more of the illustrative responses discussed above. If a detected signal does not have such a predetermined relationship to the threshold value, thereby indicating either no detected liquid leak or a detected leak that is below the predetermined threshold level or quantity, then the detection system may simply continue monitoring for a detected signal that is indicative of a (sufficient) liquid leak. In this latter example, the signal detector may be configured to monitor any signal detected thereby without requiring a corresponding change in the signal emitted by the signal emitter. For the purpose of illustration, the following discussion will refer to monitoring the detected signal to see if the detected signal is at least as great as the threshold level. However, and as discussed above, it is within the scope of the present disclosure that the detection system may be configured to monitor for other relationships between the detected signal and one or more threshold values.

Liquid leak detection system 160 may be configured to monitor and/or compare any suitable relationship between the emitted signal, the detected signal, and/or a threshold value. As an illustrative, non-exclusive example, the liquid leak detection system may be configured to generate, induce, or otherwise impart an electrical signal to, or on, signal emitter 166 and to monitor the amount, or level, of that signal that is detected by signal detector 168. In such an embodiment, the signal emitter and signal detector are placed in proximity to each other, such as in a spaced-apart relationship. Then, the level of the signal detected by signal detector 168 may be monitored and compared to a threshold value.

As an illustrative, non-exclusive example, an AC signal (2 KHz, square wave) was imparted to the signal emitter, and the level (i.e., the percentage) of signal detected by signal detector 168 was monitored and compared (such as with suitable op-amp circuitry) to a threshold value to determine if a liquid leak was detected. The signal detector was spaced-apart from the signal emitter, such as by being separated by non-conductive material. Without leaked liquid providing a conductive path between the signal detector and the signal emitter, the signal detector does not detect a signal that is at least as great as the threshold value. However, leaked liquid that contacts and extends between the signal emitter and the signal detector may increase the degree to which the signal detector absorbs, or receives, the emitted signal.

The threshold value may be selected so that the signal detector does not detect a sufficient level of the signal emitted by the signal emitter when liquid is not bridging or otherwise contacting the signal emitter and the signal detector. The distance between the signal emitter and the signal detector may affect the degree to which the signal imparted to the signal emitter is detected by the signal detector. Similarly, any material between or connecting the signal emitter and signal detector may affect the degree to which the signal detector detects the signal from the signal emitter. Therefore, the particular materials, signals, signal properties, detector properties, liquids to be detected, desired sensitivity, etc. may be factors that are considered when selecting a threshold value. The threshold value may be stored by a memory portion of a controller associated with the detection system, computed based on the emitted signal, etc. Regardless of whether and/or where the threshold value is stored, the threshold value may be a fixed value, may have a fixed relationship to an operating parameter of the fuel processing system (or measured by the controller), and/or may vary such as with respect to operator preferences and/or one or more operating parameters of the fuel processing system.

In some embodiments, the conductivity of the leaked liquid may affect the degree to which the emitted signal is detected by the signal detector. However, conductivity tends to vary with temperature. Therefore, and while not required to all embodiments, it is within the scope of the present disclosure that the threshold value may vary with temperature. As an illustrative example, and as schematically illustrated in FIG. 4, the detection system may include or be in communication with a thermocouple or other suitable temperature sensor, 174 with the controller adjusting the threshold value responsive to the detected temperature. For example, the threshold value may increase as the measured temperature increases and decrease as the measured temperature decreases. When the detection system includes, and/or is in communication with, a suitable temperature sensor, the temperature may be detected at any suitable location. In some embodiments, it may be desirable for the temperature to be detected on or proximate the signal detector and/or within a housing or shell containing portions of the fuel processing system.

The above-discussed monitoring and comparison (and any resultant output signal or command signal) may be performed by a suitable controller, logic circuit, processor, comparator, etc. As discussed, if the fuel processing system includes a control system with a microprocessor or other suitable controller, this controller may perform the monitoring and comparing, although this is not required.

The signal emitter and signal detector may be implemented with any suitable structure and in any suitable manner. It is within the scope of the present disclosure that the signal emitters and signal detectors discussed and/or illustrated herein may themselves perform the discussed signal generation, signal emitting, signal detecting, signal comparing, and/or signal monitoring operations. However, it is also within the scope of the present disclosure that signal emitter 166 and/or signal detector 168 may be in communication with at least one controller, processor, or other component or device that partially or completely performs one or more of these operations.

As an illustrative, non-exclusive example, the signal emitter and signal detector may be implemented as electrical traces that are etched or otherwise implemented in a printed, or other, circuit board. As another illustrative, non-exclusive example, the signal emitter and signal detector may be positioned in or on a support material, optionally with insulating material separating the signal emitter and the signal detector while still providing a contact region in which leaked liquid may contact the signal emitter and/or the signal detector. When the signal detector and/or the signal emitter are positioned on, or in, a support material, the support material may have any suitable construction and shape.

In some embodiments, it may be desirable for the support material to have a planar configuration, while in others it may be desirable for the support material to have a non-planar configuration. An illustrative, non-exclusive example of a non-planar configuration is a configuration in which the support material has a concave or bowl-shaped configuration that urges leaked liquid to a collection, or pooling, region. As another illustrative example, the support material may be shaped to define a discrete (typically low) number of spaced-apart collection, or pooling, regions. As still another illustrative example, the support material may be shaped to conform to the shape of the base, or lower region of a housing that contains at least portions of the fuel processing assembly and/or to conform to the shape of portions of the fuel processing assembly that the detection system is designed to be positioned beneath to detect liquid leaks therefrom. In some embodiments, a planar configuration may be desirable because it does not urge leaked liquid to a particular region of the material, while in other embodiments, a shaped non-planar configuration may be desirable.

As a design consideration, some fuel processing assemblies are designed to remain stationary and level when in use. However, other fuel processing assemblies, such as assemblies that are designed for use in vehicles and/or in marine applications, may be expected to be periodically inclined or repositioned during use. This expected motion, or lack of motion, may impact the selected configuration for the signal detector of the liquid leak detection system.

As discussed, at least one potential response to liquid leak detection system 160 detecting a liquid leak is for the operation of the fuel processing system to be stopped or otherwise interrupted. As also discussed, the fuel processing system may utilize a variety of liquids, such as water and at least one carbon-containing feedstock. It follows then that some liquid (i.e., water) may not be as hazardous or indicative of a potential system failure as others (i.e., carbon-containing feedstock). Similarly, it is possible that water may be introduced into the fuel processing system (and/or upon the detection system's signal detector) without this water being the result of a leak or malfunction of the fuel processing system. For example, liquid water may form from condensation due to temperature changes within the fuel processing system, due to humidity in the location where the fuel processing system is being operated, etc.

It is also possible that solids may be deposited on the signal detector, the signal emitter, and/or material separating these components. Illustrative, non-exclusive examples of solids that may be deposited include salts (such as from marine environments), particulate carried by the air in the environment in which the fuel processing assembly is operated, etc. Some of these deposits may be conductive or otherwise affect the detected signal, such as to cause the signal detector to detect a sufficient signal that is indicative of a liquid leak. Accordingly, it is possible that liquid leak detection system 160 may detect a liquid leak at times when liquid has not actually leaked from the fuel processing assembly. Such a false positive, or false leak, if detected, may be acceptable in view of the potential value of detection system 160 being present to also detect an actual liquid leak.

Figure 5:
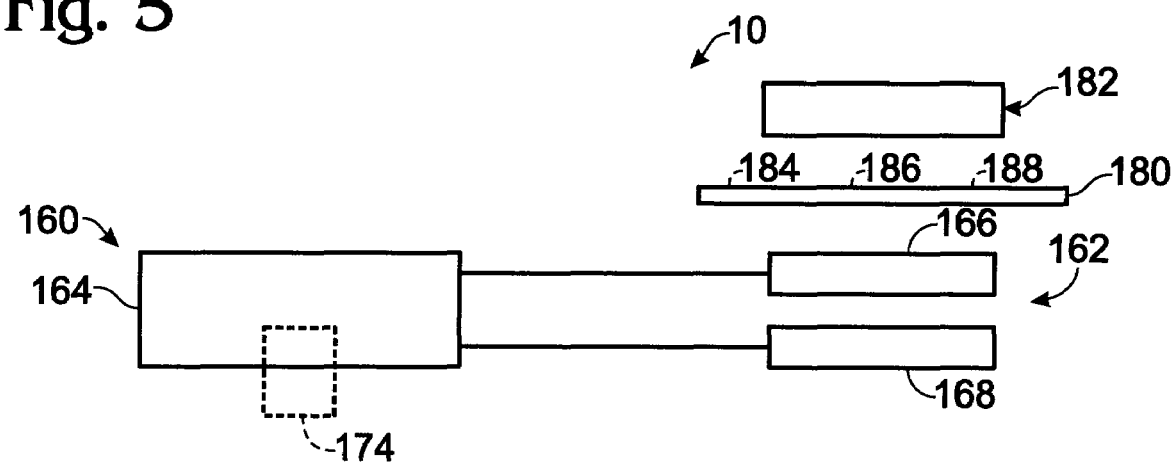
FIG. 5 is a schematic diagram showing another illustrative example of a liquid leak detection system according to the present disclosure.

In some embodiments, liquid leak detection system 160 may include a cover, or barrier, that is positioned to restrict some liquids and solids from contacting the signal emitter and/or the signal detector. For example, the cover may be positioned on or above any of the liquid detectors 162 described, illustrated, and/or incorporated herein. When the liquid detector includes a signal emitter and a signal detector, the cover may be positioned above these components of the liquid leak detection system. In FIG. 5, an illustrative, non-exclusive example of a liquid leak detection system 160 that includes such a cover, or barrier, is shown. In FIG. 5, the cover is schematically illustrated at 180. As shown, the cover is positioned generally between at least signal detector 168 and one or more of the components or elements of the fuel processing assembly from which liquid may leak or otherwise be undesirably emitted. These one or more components are generally (and schematically) indicated in FIG. 5 at 182. Illustrative, non-exclusive examples of these components 182 may, but are not required to, include the fuel processing system's feedstock delivery system, fluid delivery conduits for liquid fuels and/or liquid (carbon-containing) feedstocks, vaporization regions, hydrogen-producing region, heating assembly, etc. In FIG. 5, cover 180 is schematically illustrated as extending beyond the lateral perimeter of the components of liquid detector 162, although this construction is not required to all embodiments.

In some embodiments, cover 180 may be formed from a liquid-permeable material and/or a liquid-absorbent material 184. In such an embodiment, the cover may be described as being a solid, or particulate, barrier. When the material is an absorbent material, it may promote the distribution of any leaked liquid to the signal detector and/or signal emitter.

In some embodiments, the cover may be formed from or include a material that repels, or is not permeable to, one or more selected liquids. As an illustrative, non-exclusive example, cover 180 may include (and/or be coated with) a hydrophobic material 186 or a material that promotes beading of water upon the surface thereof. When such a material is utilized, the material may also be selected to be permeable to one or more liquid carbon-containing feedstocks that are utilized by the fuel processing assembly. As discussed, illustrative liquid carbon-containing feedstocks include methanol or other alcohols, gasoline, diesel, kerosene, and the like. Utilizing such a material for, or in, cover 180 may enable the cover to be configured or otherwise constructed permit the carbon-containing feedstock to pass through, or even be drawn through, the cover to the signal emitter and/or signal detector while retarding or impairing water from passing through the cover.

As an illustrative, non-exclusive example, consider a fuel processing assembly that is adapted to produce hydrogen gas from a liquid feed stream containing methanol and water. The methanol (or other carbon-containing feedstock portion of the feed stream), if leaked, may pass through the cover to actuate the liquid leak detection system even though the water may not (or may not appreciably) pass through the cover. On the other hand, if water condenses or otherwise is introduced into the fuel processing assembly and contacts cover 180, the water may be prevented (at least within the water-repelling capacity of the cover) from passing through the cover to actuate the detection system.

In some embodiments, the cover may include conductive particulate or conductive components 188 that are adapted to be extracted or otherwise removed from the cover with liquid that passes through the cover. The inclusion of these components 188 in the cover may increase the ability of leaked liquid that passes through the cover to actuate the detection system. For example, components 188 may increase the conductivity of the leaked liquid or otherwise increase the signal to noise ratio of the emitted signal.

Cover 180 may be formed in one or more layers and may be positioned on or spaced above the signal detector and the signal emitter. In some embodiments, cover 180 may include two or more layers of the same or different materials. In some embodiments, cover 180 (when present) may be secured to the signal detector and the signal emitter. The thickness and other materials of construction of the cover may be selectively varied, such as to adjust the sensitivity of the liquid leak detection system. Cover 180, when present, should be selected to be suitable for use in the operating environment, including the operating temperature, where the liquid leak detection system is utilized. In experiments, ceramic paper and ceramic felt have proven effective. A particular, non-exclusive example is Lytherm 550-L ceramic paper, although others may be used.

In some embodiments of liquid leak detection systems that include a cover, it may be desirable for the cover to have a uniform thickness. However, in other embodiments, a variable thickness cover may be used, such as to include thinner covers in regions where it is desirable for the detection system to be actuated (i.e., detect a leak) when less liquid has leaked or otherwise been emitted than in other areas where the cover is relatively thicker. Correspondingly, in some embodiments, the thickness of the cover may be thicker in regions where it is desired for more liquid to be leaked or otherwise emitted before the liquid leak detection system is actuated. In other words, the thickness of the cover may be used to control the sensitivity of the leak detectors (or other portions of the liquid leak detection systems) thereunder. Similarly, in some embodiments, the liquid lead detection system may even include regions that are covered by a cover and other regions that are not covered by a cover. Further illustrative, non-exclusive examples of mechanisms for defining the sensitivity of localized regions of the liquid leak detection system may selectively, or non-uniformly, applying hydrophobic (or other water-repelling) coatings to the cover, distributing conductive particulate on or within the cover, forming the cover from different materials, etc. By using one or more coatings or materials having different permeabilities for different liquids, the liquid leak detector system may be configured to actuated by some liquids and not to be actuated by others because the others (which may not have a predetermined property) are not permitted to contact, or sufficiently contact, the liquid sensor.

In some embodiments, the cover may be configured so that a predetermined volume of liquid will actuate the liquid leak detection system, such as if emitted or otherwise deposited upon the cover and/or a liquid detector. In some embodiments, the liquid leak detection system may be configured to be more sensitive, or designed to detect, a liquid having a predetermined property than a liquid that does not have this property. As an illustrative, non-exclusive example, by using a hydrophobic coating, layer, or other material in the cover, the liquid leak detection system may be configured to inhibit water passing through the cover to the liquid detector. In such an embodiment, the liquid leak detection system may be configured to be actuated (i.e., detect a liquid leak) upon receipt of at least a predetermined volume of a liquid carbon-containing feedstock, but not to be actuated upon receipt of an equal volume of water.

FIG. 6 provides an illustrative, non-exclusive example of a liquid detector 162 for a liquid leak detection system 160 according to the present disclosure. As shown, the signal detector includes two sets of elongate signal emitters 166 and signal detectors 168. Having more than one signal detector and signal emitter, while not required, may provide greater system reliability, such as in case one of the sets malfunctions. Similarly, although not required, utilizing a liquid detector that extends across an expansive region may provide greater and/or quicker detection of liquid leaks. In FIG. 6, the signal detector and signal emitter are shown as elongate, adjacent traces in a planar circuit board. An AC or other suitable signal may be applied or otherwise imparted to the signal emitter, and the signal detected by the signal detector may be monitored and compared to a threshold value to determine if a liquid leak is detected.

In FIG. 7, an illustrative, non-exclusive example of a suitable cover 180 for the liquid detector of FIG. 6 is shown. Cover 180 may be placed upon the liquid detector, adhered to the liquid detector, or supported above the liquid detector. FIG. 8 illustrates somewhat schematically the cover 180 of FIG. 7 positioned on the liquid detector of FIG. 6. As evident by comparing FIGS. 6-8, the illustrated, non-exclusive example of a cover is sized to extend over the liquid detector 162 of FIG. 6 and to generally correspond in size thereto. In some embodiments, cover 180 may be sized to be larger in surface area than the corresponding leak detector, while in others it may be sized to cover signal emitter(s) 166 and signal detector(s) 168 while otherwise being smaller in surface area than leak detector 162. As discussed, it is within the scope of the present disclosure that the cover may be placed upon the liquid detector, secured to the liquid detector, or supported above the leak detector.

Figure 9:
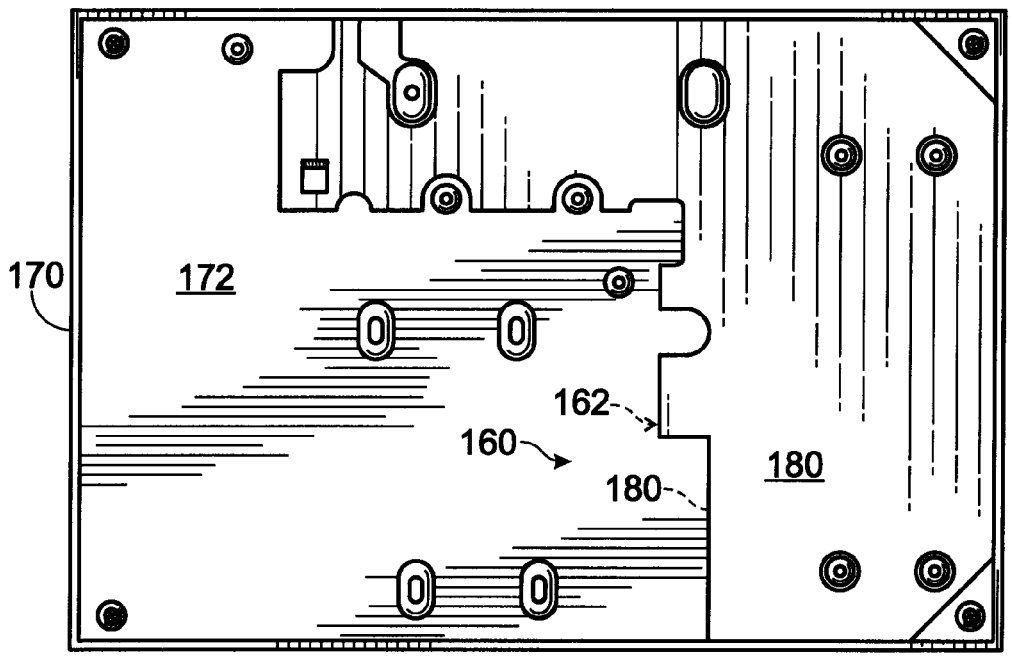
FIG. 9 is a top plan view of a liquid leak detection system according to the present disclosure positioned on the base of a housing for a fuel processing system.

In FIG. 9, the liquid sensor and cover of FIGS. 6 and 7 are shown positioned upon a base 172 of a housing 170 for the fuel processing system. As indicated in dashed lines in FIG. 9, in some embodiments, the liquid leak detector system may include a cover 180 on each side of the liquid sensor, although this is not required to all embodiments. As a variant, in some embodiments, the liquid detector(s) may be embedded, enclosed, or otherwise received within a cover 180. As discussed, the extent to which liquid sensor 162 extends over, or along, the base may be particularly determined, or selected, based upon the position of liquid-carrying conduits and/or components of the fuel processing system within the housing. For example, in some embodiments, it may be desirable to have the liquid sensor extend along the entire surface of the base. In other embodiments, it may be desirable to have the liquid sensor extend beneath only selected portions, but not all, of the fuel processing system, such as beneath regions in which liquids may be unintentionally emitted from the fuel processing system. These selected regions may include regions in which liquids are present in the fuel processing system and/or regions where condensable vapors are present and which may condense to a liquid if emitted from the portion of the fuel processing system (such as a region of higher temperature and/or pressure).

Figure 10:
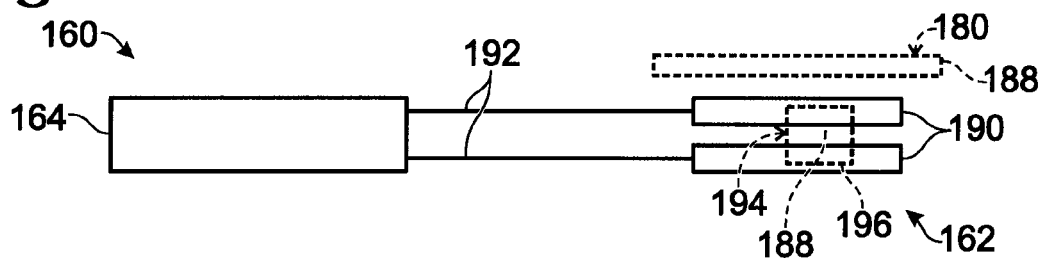
FIG. 10 is an schematic view of an illustrative, non-exclusive example of a liquid leak detection system according to the present disclosure that includes a signal emitter and a signal detector.

In FIG. 10, another illustrative, non-exclusive example of a suitable construction for liquid detectors 162 of liquid leak detection systems 160 according to the present disclosure is shown. As illustrated, the liquid detector includes a plurality (at least two) of spaced-apart conductive members 190. Conductive members 190 are in communication with a controller 164 that imparts an electrical current or other signal to at least one of the conductive members and which detects whether the current or other signal is transmitted to one or more of the other conductive members in the plurality of conductive members. As discussed, controller 164 may (but is not required to) include, or be in communication with, a power source or power supply, a temperature sensor, other components of the fuel processing system, other controllers within the fuel processing system, and the like.

As an illustrative, non-exclusive example, the controller may be configured to detect whether a closed circuit is formed between two of the conductive members, which nominally (i.e., when not bridged by leaked liquid) define an open circuit. For example, and as somewhat schematically illustrated in FIG. 10, the controller may be electrically connected to the plurality of conductive members 190 by wires 192. It is also within the scope of the present disclosure that the controller may be electrically connected directly to the conductive members and/or that the conductive members take the form of one or more wires. Because the conductive members are spaced-apart from each other, they will define an open circuit when a conductive path is not formed between the conductive members. During normal operation of the fuel processing system, no such conductive path will exist. Accordingly, an electrical potential applied to at least one of the conductive members will not flow to another of the conductive members to form a closed circuit that may be detected by the controller or another suitable electrical detector. This detection of the closed circuit may be accomplished via any suitable mechanism. When liquid leaks from the fuel processing system and forms such a conductive path to electrically interconnect two or more of the conductive members, then the applied electrical potential may flow through the closed circuit that is established by the conductive members and the liquid that forms this conductive path. The conductive path, which also may be referred to as a conductive bridge, is illustrated in FIG. 10 at 194. As discussed, the conductive bridge is formed from leaked liquid, which is indicated at 196. When the liquid leak detection system 160 includes a cover 180, the conductive bridge may additionally include conductive particulate 188 that is drawn from the cover by the leaked liquid.

Figure 11:
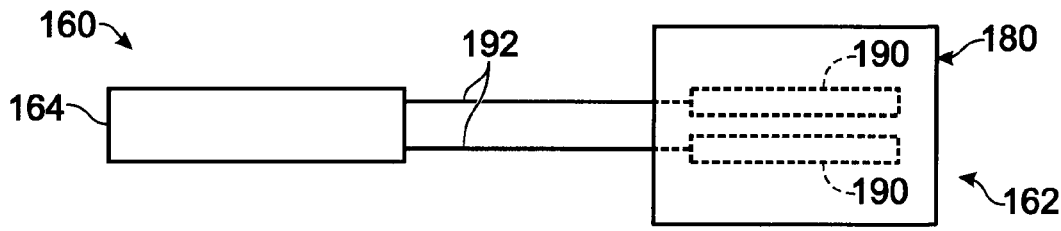
FIG. 11 is an schematic view of another illustrative, non-exclusive example of a liquid leak detection system according to the present disclosure that includes a signal emitter and a signal detector.
Figure 12:
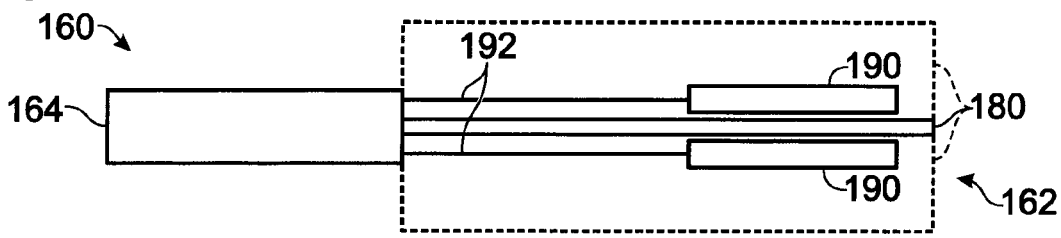
FIG. 12 is an schematic view of an illustrative, non-exclusive example of a liquid leak detection system according to the present disclosure that includes a liquid detector with a pair of conductive members.

In a variation of this electrical conductive embodiment, at least one conductive member of the plurality of conductive members 190 may be partially or completely sheathed or encased by, or otherwise inserted within, cover 180. This is schematically illustrated in FIG. 11. In a further variation, and as schematically illustrated in FIG. 12, cover 180 may separate corresponding ones of the plurality of conductive members 190. In such an embodiment, the leaked liquid will need to pass, through capillary action, absorption, or otherwise, through the cover to establish the conductive bridge. As indicated in dashed lines in FIG. 12, the cover may optionally also cover and/or at least substantially enclose one or more of the conductive members 190 in addition to separating the conductive members.

Figure 13:
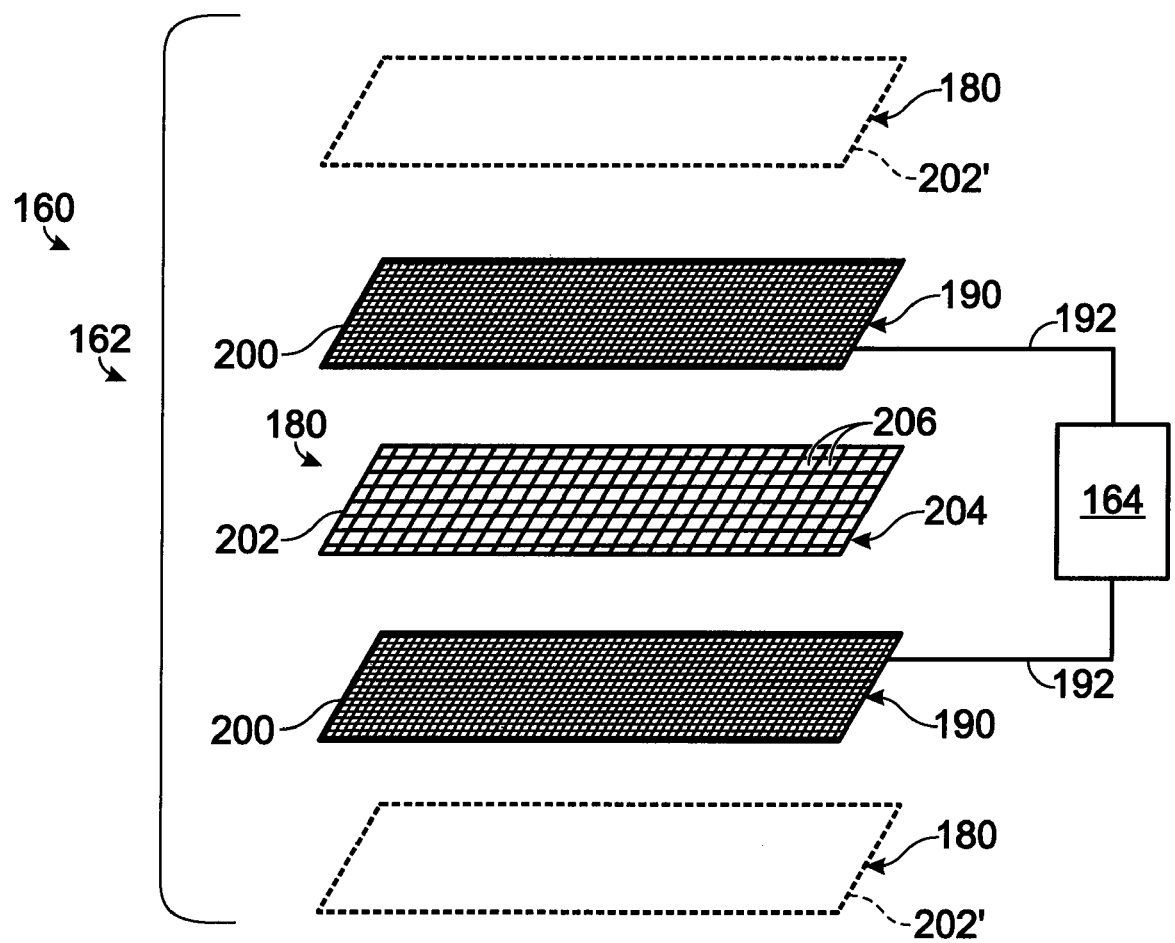
FIG. 13 is an exploded, partially schematic view of another illustrative, non-exclusive example of a liquid leak detection system according to the present disclosure that includes a liquid detector with a pair of conductive members.

Illustrative, non-exclusive examples of suitable constructions for conductive members 190 include screens (or other perforated sheets, meshes, or expanded metal members) and wires. In FIG. 13, an illustrative example of a liquid leak detection system that includes conductive members 190 in the form of screen members 200 that are separated by insulating material 202. Insulating material 202 may form a non-conductive barrier 204 between the screen members and may form a portion of a cover 180. As schematically illustrated at 202', insulating material 202 may additionally or alternatively be present around, or on opposed surfaces of the conductive members.

Figure 14:
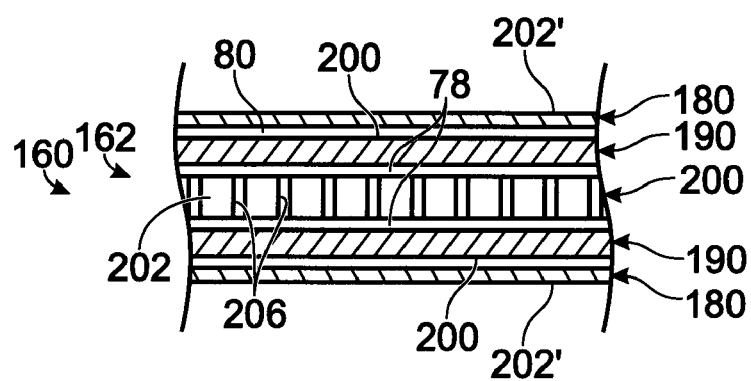
FIG. 14 is a fragmentary cross-sectional view of an illustrative, non-exclusive example of a liquid detector according to FIG. 13.

Insulating material 202 should be permeable to at least the carbon-containing feedstock portion of any liquid that may be emitted to the cover from the fuel processing system, and in some embodiments may be partially or completely permeable to water. The liquid permeability of the insulating material may be inherent in the composition of the insulating material, such as if the material is porous, absorptive, or the like. Additionally or alternatively, the insulating material may have one or more passages 206 formed therein to define potential flow paths for liquid to pass through the insulating material, such as via capillary action, via gravity flow, etc. An illustrative, non-exclusive example of such a construction is shown in FIG. 14. In this latter embodiment, when the insulating material is substantially or completely impermeable to the liquid, then the passages that are formed through the insulating material may be positioned, i.e., designed or selected, to define where liquid may pass through the insulating material to form the conductive bridge to actuate the liquid leak detection system. This feature may be utilized, such as by the number, size, and/or position of the passages, to provide sensitivity, or selectivity, to the liquid leak detection system. For example, in regions where it is desirable to actuate the liquid leak detection system if comparatively small amounts of liquid are present, then the passages may be larger and/or present in greater numbers. In contrast, in regions where it is desirable for the liquid leak detection system to not be actuated unless a greater amount of liquid is present, such as more than a threshold volume of liquid, then fewer and/or smaller passages may be formed. Furthermore, in regions where liquid is likely to be present (from the fuel processing system or its environment), no passages may be formed so that such liquid will not actuate the liquid leak detection system unless it is present in a sufficient volume to flow to another region of the liquid leak detection system.

The screens and insulating material may have any suitable shape and size, including planar, curved, and other shapes. In some embodiments, the screens, insulating material, and/or cover (when present) may be shaped to generally conform to a supporting base and/or to the components of the fuel processing system beneath which these components are positioned. In some embodiments, at least the cover for the screens or other conductive members may be concave, trough-shaped, or otherwise shaped to define one or more liquid-pooling regions into which leaked liquid that encounters the cover will flow.

Figure 15:
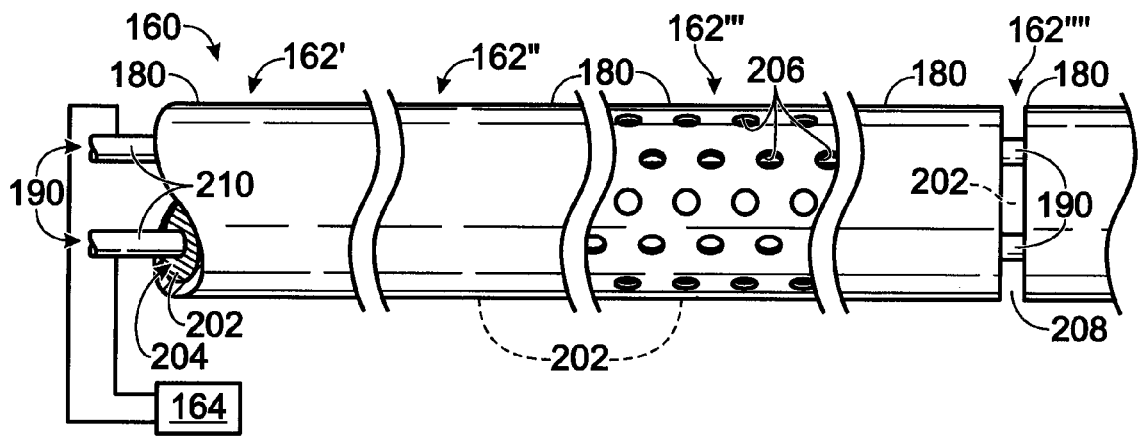
FIG. 15 is a fragmentary, partially schematic side elevation view of other illustrative, non-exclusive examples of liquid leak detection systems according to the present disclosure that includes a liquid detector with a pair of conductive members.

In FIG. 15, an illustrative, non-exclusive example of a liquid leak detection system 160 is shown in which liquid detector 162 includes conductive members 190 that take the form of wires 210. As shown, the wires are sheathed, or enclosed, in a cover 180, and the wires may be partially or completely separated by non-conductive insulating material 202 that forms a conductive barrier 204 between the wires.

The cover and/or insulating material may have a rigid construction, in which case the liquid detector has a defined shape, or a flexible construction, in which case the liquid detector may be shaped and/or oriented after formation, such as to conform to a particular fuel processing system. As somewhat schematically illustrated in FIG. 15, the wires may be electrically connected to a controller 164 that detects when a closed circuit is formed by the wires and liquid from the fuel processing system.

Similar to previously discussed embodiments, the cover and/or insulating material may be formed from liquid-permeable materials and/or may include defined passages through which liquid may pass even if the cover and/or insulating material is formed from (or is otherwise treated or coated to be) impermeable to water and/or carbon-containing feedstock. Illustrative, non-exclusive examples of these options are somewhat schematically illustrated in FIG. 15. As indicated at 162', cover 180 and/or insulating material 202 may be permeable to at least one of water and a liquid carbon-containing feedstock that is used in the fuel processing system. In such an embodiment, the cover and/or insulating material do not need to include defined liquid passages to permit liquid to pass therethrough to establish a conductive bridge, or conductive linkage, between the wires. While such passages may still be utilized, they would not be required due to the permeable nature of the cover and/or insulating material. As indicated at 162", at least a region of the cover and/or insulating material may be impermeable to water and/or the liquid carbon-containing feedstock and thereby define a region of the liquid detector that is not going to actuate the liquid leak detection system if water or other liquids are present. As discussed, such a region may be desirable in areas of a fuel processing system in which liquid may be present (from the fuel processing system or its environment) and in which it is still desired for the liquid detector to extend therethrough. At 162''', the cover is shown including a plurality of apertures or other passages 206 through which liquid may pass through the cover. In such an embodiment, the insulating material (if present) may include corresponding passages so that the liquid may reach, and establish an electrical bridge between, the wires. Additionally or alternatively, the insulating material, if present, may be liquid permeable. The number, size, and relative position of the passages may vary without departing from the scope of the present disclosure. At 162'''', the cover 180 includes a break, or gap, 208 between adjacent regions of the cover. This gap defines a region where liquid may pass from exterior the cover to the wires contained within the cover, and such a construction will typically be utilized when the cover is impermeable to water and/or the carbon-containing feedstock used in the fuel processing system. In such a configuration, insulating material, if present, may also be removed or otherwise not present in the gap. Alternatively, the insulating material may be permeable to liquid so as not to interfere with the passage of liquid from external the cover to the wires.

As discussed herein, the various components of the liquid leak detection system should be selected so as to be chemically and physically stable and suitable for use in the operating environment of the fuel processing system, including at the elevated temperatures and/or pressures encountered during use of the fuel processing system and/or the potential for being exposed to the various liquid and/or gaseous fluids present in the fuel processing system. Illustrative, non-exclusive examples of suitable insulating materials include (but are not limited to) ceramics, high-temperature felts, alumina, and the like. Furthermore, it is within the scope of the present disclosure that a single controller 164 may be utilized with two or more liquid detectors 162. Similarly, where the liquid detectors utilize an electrical ground, it is within the scope of the present disclosure that the housing or shell of the fuel processing system may (but is not required to) be this ground.

As discussed, in many applications it is desirable for the fuel processor to produce at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Accordingly, fuel processing system 10 may (but is not required to) further include a purification region 24, in which a hydrogen-rich stream 26 is produced from the output, or mixed gas, stream 20. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, and/or consumed by the fuel processing assembly.

Purification region 24 may, but is not required to, produce at least one byproduct stream 28. Byproduct stream 28 contains at least one of a lower concentration of hydrogen gas and a greater concentration of one or more of the other gases or impurities that were present in the output stream. Byproduct stream 28 may (but is not required to) contain some hydrogen gas. When present, byproduct stream 28 may be exhausted, sent to a burner assembly or other combustion source, used as a heated fluid stream, stored for later use, or otherwise utilized, stored or disposed of. It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced overall hydrogen concentration as the output stream. For example, in some applications where product hydrogen stream 14 may be used, certain impurities, or non-hydrogen components, are more harmful than others. As a specific example, in many conventional fuel cell systems, carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative examples of suitable devices for purification region 24 include one or more hydrogen-selective membranes 30, chemical carbon monoxide removal assemblies 32, and pressure swing adsorption systems 38. It is within the scope of the disclosure that purification region 24 may include more than one type of purification device, and that these devices may have the same or different structures and/or operate by the same or different mechanisms. As discussed, hydrogen-producing fuel processing system 10 may include at least one restrictive orifice or other flow restrictor downstream of at least one purification region, such as associated with one or more of the product hydrogen stream, hydrogen-rich stream, and/or byproduct stream.

Hydrogen-selective membranes 30 are permeable to hydrogen gas, but are at least substantially, if not completely, impermeable to other components of output stream 20. Membranes 30 may be formed of any hydrogen-selective material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Chemical carbon monoxide removal assemblies 32 are devices that chemically react carbon monoxide and/or other undesirable components of output stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 521 (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown within fuel processor 12. It is within the scope of the disclosure that region 24, when present, may alternatively be separately located downstream from the fuel processor, as is schematically illustrated in dash-dot lines in FIG. 1. It is also within the scope of the disclosure that purification region 24 may include portions within and external fuel processor 12.

It is further within the scope of the disclosure that one or more of the components of fuel processing system 10 may either extend beyond the shell or be located external at least shell 68. For example, and as discussed, purification region 24 may be located external shell 68, such as with the purification region being coupled directly to the shell (as schematically illustrated in FIG. 10) or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line representing an alternative shell configuration in FIG. 1.

In the context of a fuel processor, or fuel processing assembly, that is adapted to produce a product hydrogen stream that will be used as a feed, or fuel, stream for a fuel cell stack, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors and fuel processing assemblies, including illustrative (non-exclusive) examples of components and configurations therefor for producing streams of at least substantially pure hydrogen gas are disclosed in U.S. Pat. Nos. 6,319,306, 6,221,117, 5,997,594, 5,861,137, and U.S. Patent Application Publication Nos. 2001/0045061, 2003/0192251, 2003/0223926, and 2006/0090397. The complete disclosures of the above-identified patents and patent applications are hereby incorporated by reference for all purposes.

Figure 16:
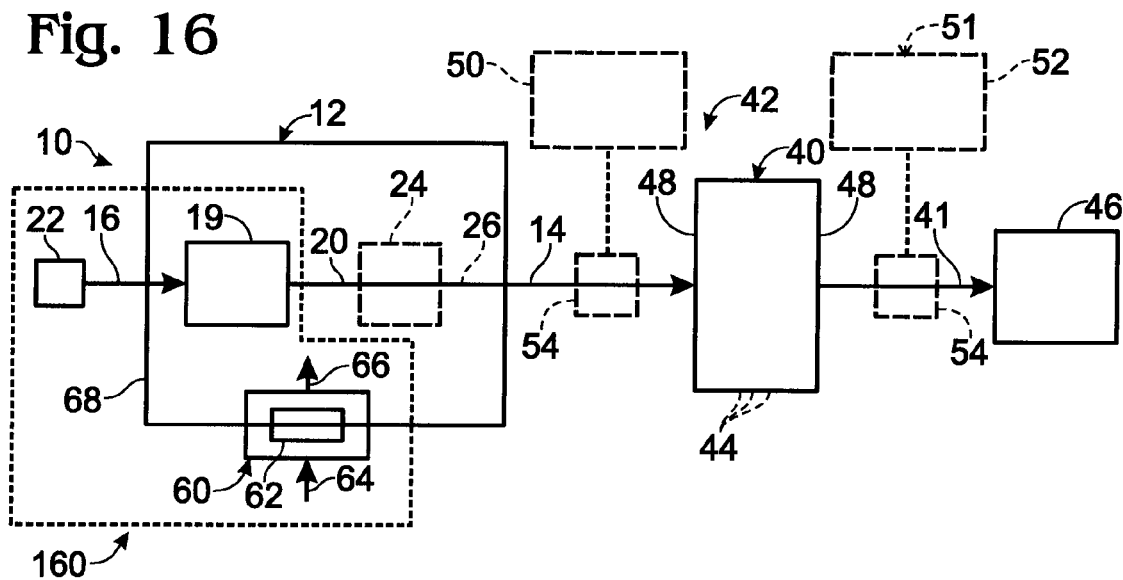
FIG. 16 is a schematic diagram showing a hydrogen-producing fuel cell system with a liquid leak detection system according to the present disclosure.

As discussed, product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 16, in which a fuel cell stack is indicated at 40 and produces an electric current, which is schematically illustrated at 41. In such a configuration, in which the fuel processor or fuel processing assembly is coupled to a fuel cell stack, the resulting system may be referred to as a fuel cell system 42 because it includes a fuel cell stack and a source of fuel for the fuel cell stack. It is within the scope of the present disclosure that fuel processors, feedstock delivery systems, heating assemblies, and liquid leak detection systems according to the present disclosure may be used in applications that do not include a fuel cell stack.

When product hydrogen stream 14 is intended for use in a fuel cell stack, compositions that may damage the fuel cell stack, such as carbon monoxide and carbon dioxide, may be removed from the hydrogen-rich stream, if necessary, such as by purification region 24. For some fuel cell stacks, such as proton exchange membrane (PEM) and alkaline fuel cell stacks, it may be desirable for the concentration of carbon monoxide to be less than 10 ppm (parts per million), less than 5 ppm, or even less than 1 ppm. The concentration of carbon dioxide may be greater than that of carbon monoxide. For example, concentrations of less than 25% carbon dioxide may be acceptable in some embodiments. For some fuel cell stacks, it may be desirable for the concentration of carbon dioxide to be less than 10%, less than 1%, or even less than 50 ppm. The acceptable minimum concentrations presented herein are illustrative examples, and concentrations other than those presented herein may be used and are within the scope of the present disclosure. For example, particular users or manufacturers may require minimum or maximum concentration levels or ranges that are different than those identified herein.

Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current, or electrical output, produced by stack 40 may be used to satisfy the energy demands, or applied load, of at least one associated energy-consuming device 46. Illustrative examples of devices 46 include, but should not be limited to, motor vehicles, recreational vehicles, construction or industrial vehicles, boats or other seacraft, tools, lights or lighting assemblies, appliances (such as household or other appliances), households or other dwellings, offices or other commercial establishments, computers, signaling or communication equipment, battery chargers, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 16 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 16. Fuel processing and/or fuel cell systems according to the present disclosure may, but are not required to, include at least one hydrogen storage device. Hydrogen-storage device 50 is adapted to store at least a portion of product hydrogen stream 14. For example, when the demand for hydrogen gas by fuel cell stack 40 is less than the hydrogen output of fuel processor 12, the excess hydrogen gas may be stored in hydrogen-storage device 50. Illustrative examples of suitable hydrogen storage devices include hydride beds and pressurized tanks. Although not required, a benefit of fuel processing system 10 or fuel cell system 42 including a supply of stored hydrogen is that this supply may be used to satisfy the hydrogen requirements of fuel cell stack 40, or the other application for which product hydrogen stream 14 is used, in situations when fuel processor 12 is not able to meet these hydrogen demands. Examples of these situations include when the fuel processor is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processor. Additionally or alternatively, the stored hydrogen may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

Fuel cell system 42 may also include at least one energy-storage device 51 that is adapted to store the electric potential, or power output, produced by fuel cell stack 40. Illustrative, non-exclusive examples of other energy storage devices that may be used include a battery 52, flywheels, and capacitors, such as ultracapacitors or supercapacitors. Similar to the above discussion regarding excess hydrogen gas, fuel cell stack 40 may produce a power output in excess of that necessary to satisfy the load exerted, or applied, by energy-consuming device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by fuel cell system 42 during startup or other applications in which the system is not producing electricity and/or hydrogen gas. In FIG. 16, flow-regulating structures are generally indicated at 54 and schematically represent any suitable manifolds, valves, controllers, switches and the like for selectively delivering hydrogen and the fuel cell stack's power output to hydrogen-storage device 50 and energy-storage device 51, respectively, and to draw the stored hydrogen and stored power output therefrom.

In FIG. 16, liquid leak detection system 160 is schematically illustrated in dashed lines to graphically represent that hydrogen-producing fuel cell system 42 may include any of the liquid leak detection systems 160 that are described, illustrated, and/or incorporated herein including the components and/or subcomponents thereof. In FIGS. 17-24 this is graphically represented by solid arrow 160.

Figure 17:
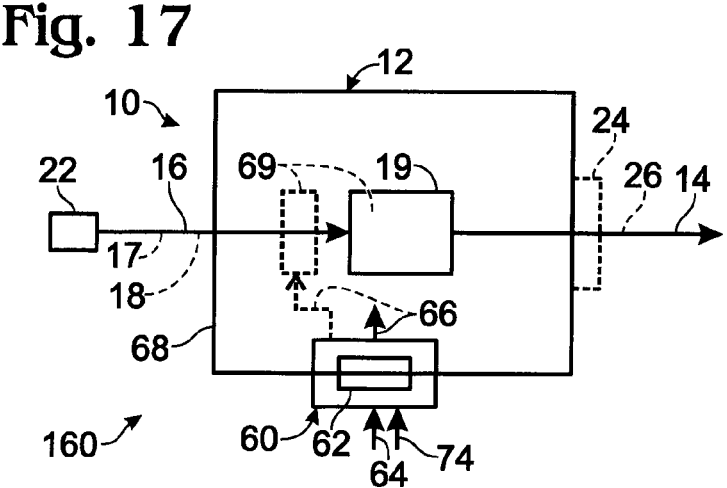
FIG. 17 is a schematic diagram of another fuel processing system with a liquid leak detection system according to the present disclosure.

As indicated in dashed lines in FIG. 17, fuel processing systems 10 according to the present disclosure may include a vaporization region 69 that is adapted to receive a liquid feed stream 16 (or a liquid component of feed stream 16, such as a stream of water 17 or a stream of a liquid carbon-containing feedstock 18) and to vaporize the feed stream (or portion thereof) prior to delivery to hydrogen-producing region 19 of fuel processor 12. As indicated schematically in FIG. 17, heated combustion stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor is adapted to receive a feed stream that is gaseous or that has already been vaporized. It is also within the scope of the present disclosure that vaporization region 69, when present, extends partially or completely outside of shell 68 (when present). Liquid leak detection systems according to the present disclosure may, but are not required to, be positioned beneath a vaporization region and/or at least fluid conduits extending thereto.

In FIG. 17, an air stream 74 for heating assembly 60 is shown in solid lines; however, it is within the scope of the disclosure for the air stream to additionally or alternatively be delivered to the heating assembly with at least one of the fuel streams 64 for the heating assembly 60 and/or drawn from the environment within which the heating assembly is utilized.

Fuel processors 12, feedstock delivery systems 22, heating assemblies 60, and liquid leak detection systems 160 according to the present disclosure may be configured in any of the arrangements described, illustrated and/or incorporated herein. In some embodiments, features or aspects from one or more of the above described configurations may be combined with each other and/or with additional features described herein. For example, it is within the scope of the present disclosure that fuel processing systems 10 that include at least one purification region 24 may (but are not required to) house the hydrogen-producing region 19 and at least a portion of the purification region together in a common housing, with this housing optionally being located within the shell 68 of the fuel processor. This is schematically illustrated in FIG. 18, in which reference numeral 25 generally indicates a hydrogen-producing region 19 of a fuel processor, with the hydrogen-producing region being contained within a housing, or vessel, 27 that contains at least the reforming (or other) catalyst 23 used to produce the mixed gas stream from the feed stream that is delivered to the hydrogen-producing region.

As indicated in dashed lines in FIG. 18, shell 27 (and thereby region 25) may, but is not required to, also include a purification region 24. For example, as illustrated in dashed lines in FIG. 18, the purification region, when present in the housing, may include one or more hydrogen-selective membranes 30 and/or a chemical carbon monoxide removal assembly 32. Accordingly, region 25 may be described as a hydrogen-producing and purifying region when it contains both a hydrogen-producing region 19 and a purification region 24. It is within the scope of the disclosure that any of the regions 19 and 24 described, illustrated and/or incorporated herein may be used in region 25. When region 25 does not include a purification region, it may simply be described as a hydrogen-producing region 19 that includes a housing 27. When housing 27 includes a purification region 24, it is still within the scope of the present disclosure that the fuel processing assembly may include one or more additional purification regions (such as which may include the same or different purification devices/mechanisms) external (i.e., downstream from) housing 27. The fuel processing assemblies illustrated herein thereby include a hydrogen-producing region that is contained in a housing, with this housing optionally also containing a purification region. As also illustrated in FIG. 18, it is within the scope of the present disclosure that vaporization region 69, when present, may extend partially or completely within housing 27.

Many hydrogen-producing fuel processors, such as steam and autothermal reformers and pyrolysis and partial oxidation reactors, utilize a carbon-containing feedstock that is used in the hydrogen-producing reaction, and then a separate fuel stream, which typically also includes a carbon-containing feedstock, that is used as a fuel source for the heating assembly. As such, these conventional fuel processing assemblies require a separate source, pump, or other delivery assembly, transport conduits, and flow-regulating devices, etc. According to an aspect of the present disclosure, which is not required to all embodiments, a liquid-phase carbon-containing feedstock 84 may be used for both carbon-containing feedstock portion 18 of feed stream 16 for reforming region 19 and carbon-containing feedstock portion 65 of fuel stream 64 for heating assembly 60, such as schematically illustrated in FIG. 19. This dual use of carbon-containing feedstock 84 is not required to all embodiments of the present disclosure. FIG. 19 also provides a graphical illustration of a hydrogen-producing fuel processing assembly that includes more than one feedstock delivery system 22, such as a delivery system 22 that is adapted to deliver a feed stream containing water 17, a feed stream containing liquid carbon-containing feedstock 18, and/or a feedstock delivery system 22 that is adapted to deliver fuel stream 64. As illustrated in dashed lines in FIG. 19, it is within the scope of the present disclosure that the previous example of three feedstock delivery systems may additionally or alternatively be implemented as a single feedstock delivery system 22, such as which may include more than one pump and/or produce more than one outlet stream. It is further within the scope of the present disclosure that not all liquid streams to the fuel processing assembly are delivered by a feedstock delivery system 22. Instead, one or more of the streams may be delivered by a different mechanism or delivery system. Liquid leak delivery systems 160 according to the present disclosure may additionally or alternatively be utilized with these other mechanisms or delivery systems.

In the illustrative example shown in FIG. 19, liquid carbon-containing feedstock 84 is delivered to both heating assembly 60 and hydrogen-producing region 19. FIG. 19 has been shown in a fragmentary view because fuel processor 12 may have a wide variety of configurations, such as configurations that do not include a purification region, that utilize more than one type or number of purification mechanism, etc. It is intended that the fragmentary fuel processor shown in FIG. 19 (and subsequent figures) schematically represents any of these configurations, as well as any of the steam reformers and other fuel processors described, illustrated and/or incorporated herein.

FIG. 20 is similar to FIG. 19, except that the liquid carbon-containing feedstock 84 is delivered as a single stream to valve assembly 86, in which the carbon-containing feedstock is selectively delivered to at least one of the heating assembly and the hydrogen-producing region. Valve assembly 86 may include any suitable structure for selectively dividing the stream of carbon-containing feedstock between the heating assembly and the hydrogen-producing region. The range of possible configurations includes the heating assembly receiving all of the liquid carbon-containing feedstock, the hydrogen-producing region receiving all of the carbon-containing feedstock, or both the heating assembly and the hydrogen-producing region receiving carbon-containing feedstock. As discussed herein, the distribution of the carbon-containing feedstock depends at least in part upon the particular carbon-containing feedstock being used, whether byproduct stream 28 is also used as a fuel for at least a portion of heating assembly 60, and the particular mode of operation of the fuel processor, such as an idle mode, a startup mode, or a hydrogen-producing mode.

The distribution of liquid carbon-containing feedstock 84 between the hydrogen-producing region and the heating assembly may be manually controlled. However, in many embodiments, it may be desirable for the distribution to be predetermined and/or at least partially automated, such as by including a controller 88 that selectively regulates the delivery of feedstock 84 between the hydrogen-producing region and the heating assembly. An example of a suitable controller for a steam reforming fuel processor is disclosed in U.S. Pat. No. 6,383,670, the complete disclosure of which is hereby incorporated by reference. In some embodiments, controller 88 and/or valve assembly 86 may be configured to allow a predetermined initial volume of carbon-containing feedstock into heating assembly 60, as will be discussed in greater detail herein.

As discussed previously, in the context of a steam reformer or other fuel processor that produces hydrogen gas from water and a carbon-containing feedstock, feed stream 16 may be at least substantially, and typically entirely, comprised of a mixture of water and a liquid-phase carbon-containing feedstock 84 that is preferably miscible in, or with, water. As such, a single (composite) feed stream 90 containing water 17 and carbon-containing feedstock 84 can be consumed as both the hydrogen-producing feed stream 16 for the reforming reaction, as well as the heating assembly fuel stream 64. Further reduction in the supplies, delivery systems, flow regulators, delivery conduits and the like may be achieved according to another aspect of the present disclosure by feed stream 16 and fuel stream 64 both containing the same liquid carbon-containing feedstock 84 and water 17, with the carbon-containing feedstock preferably being miscible in water. This is schematically illustrated in FIGS. 21 and 22, in which this composite stream is indicated at 90. Streams 16 and 64 may have nearly, or completely, identical compositions, and may be entirely formed from stream 90. It is within the scope of the disclosure, however, that at least one of streams 16 and 64 may have at least one additional component or additional amount of water or carbon-containing feedstock added thereto prior to consumption of the stream by the heating assembly or hydrogen-producing region. Similarly, it is within the scope of the present disclosure that additional streams may deliver additional components or additional amounts of water or carbon-containing feedstock to the heating assembly or the fuel processor.

Similar to the previously discussed alternatives of FIGS. 20 and 21 (where only the carbon-containing feedstock component 84 of feed stream 16 was delivered to heating assembly 60 rather than both the carbon-containing feedstock 84 and the water 17), composite feed stream 90 may be selectively delivered to heating assembly 60 and hydrogen-producing region 19 in separate streams from the same source or from different sources, as schematically illustrated in FIG. 21. Alternatively, and as schematically illustrated in FIG. 22, a single composite feed stream 90 may be delivered to the fuel processing assembly, and more specifically to a valve assembly 86, where the stream is selectively divided between the heating assembly and the hydrogen-producing region. A controller 88, which may be a manual controller or a computerized or other electronic controller or preprogrammed controller, is also shown in dashed lines in FIG. 22. Controller 88 may be located internal or external fuel processor 12, and/or may include both internal and external components.

The relative amounts of water 17 and liquid carbon-containing feedstock 84 in composite feed stream 90 may vary within the scope of the present disclosure. For example, the ratio may depend upon such factors as the particular carbon-containing feedstock being used, the hydrogen-producing mechanism being used in the fuel processor, user preferences, the catalyst being utilized, the demand for hydrogen gas, the efficiency of the reforming catalyst, etc. The relative concentrations of these components may be expressed in terms of a ratio of water to carbon. When feedstock 84 is methanol, a 1:1 molar ratio of steam to carbon has proven effective. When feedstock 84 is ethanol, a ratio of 2-3:1 has proven effective. When feedstock 84 is a hydrocarbon, a ratio of approximately 3:1 is typically used. However, the illustrative ratios described above are not meant to be exclusive ratios within the scope of the disclosure, and others, including greater and lesser ratios, may be used.

In FIG. 23, a variation of the configuration of FIG. 22 is shown to illustrate that it is within the scope of the present disclosure that valve assembly 86 may be located either internal or external fuel processor 12. FIG. 23 also illustrates that when the fuel processor includes or is otherwise associated with a purification region 24 that produces a gaseous byproduct stream 28, the gaseous byproduct stream 28 may be delivered to the heating assembly to be used as a gaseous fuel for the heating assembly. This gaseous fuel may supplement the liquid fuel discussed above (such as carbon-containing feedstock 84 or composite feed stream 90), or may itself contain sufficient heating value for certain steam reformers or other fuel processors and/or certain operating configurations of the fuel processors.

Illustrative examples of hydrogen-producing fuel cell systems 42, hydrogen-producing fuel processing systems 10, feedstock delivery systems 22, liquid leak detection systems 160, and heating assemblies 60 have been schematically illustrated in various ones of FIGS. 1-23. These systems may include additional components, such as air/oxidant supplies and delivery systems, heat exchange assemblies and/or sources, controllers, sensors, valves and other flow controllers, power management modules, etc. It is within the scope of the present disclosure to selectively include one or more of these components. Similarly, although a single fuel processor 12 and/or a single fuel cell stack 40 are shown in various ones of FIGS. 1-23, it is within the scope of the disclosure that more than one of either or both of these components may be used.

It is also within the scope of the present disclosure that the liquid leak detection systems disclosed herein may be utilized in other applications where it is desirable, or even necessary, to detect liquid leaks. As discussed, in some embodiments, the liquid that may be leaked is a combustible liquid. In some embodiments, the liquid leak detection systems may be used to detect liquid leaks of non-water liquids, leaks of non-water liquids in environments or applications where water may be present, and/or non-water liquid portions of water-containing liquid mixtures. Illustrative, non-exclusive examples include using the liquid leak detection systems that are described, illustrated, and/or incorporated herein to detect liquid leaks at or around storage vessels and storage apparatus for liquid fuels and/or combustible liquids. Additional illustrative, non-exclusive examples include using the liquid leak detection systems that are described, illustrated, and/or incorporated herein to detect liquid leaks at or around fluid distribution conduits for liquid fuels or combustible liquid streams.

As another illustrative, non-exclusive example, liquid leak detection systems 160 according to the present disclosure may be utilized with direct methanol fuel cell systems. In a direct methanol fuel cell system, methanol is not consumed in a catalytic reforming reaction to produce hydrogen gas. Instead, methanol and water are consumed directly by the fuel cell stack to produce an electrical output (and water). Specifically, methanol is oxidized in a catalyst-containing anode region of a direct methanol fuel cell to produce carbon dioxide. Liberated protons may pass through the electrolytic membrane, or barrier, to the air-containing (or other oxidant-containing) cathode region, where water is formed. Liberated electrons cannot pass through the electrolytic barrier and instead travel through an external circuit. Similar to the above discussion about providing solutions of methanol and/or methanol and water to a hydrogen-producing region and/or heating assembly of a hydrogen-producing fuel processing assembly, direct methanol fuel cell systems also require a feedstock delivery system to deliver at least methanol, and often methanol and water, to a direct methanol fuel cell, or fuel cell stack.

A direct methanol fuel cell system that includes a liquid leak detection system according to the present disclosure is schematically illustrated in FIG. 24. In FIG. 24, the direct methanol fuel cell system is schematically illustrated at 220 and includes a feedstock delivery system 22' that is adapted to deliver a feed stream 16', such as via one or more fluid conduits 224, of methanol 226 and/or of methanol 226 and water 228 from a suitable source, or supply, to at least one direct methanol fuel cell 222. Feedstock delivery system 22' may, but is not required to, be referred to as a methanol delivery system. When the feedstock delivery system is adapted to deliver the feed stream to more than one direct methanol fuel cell 222, the plurality of direct methanol fuel cells may form at least one direct methanol fuel cell stack 221. As discussed, the feedstock delivery system may include one or more storage tanks or liquid reservoirs of methanol (and/or water) and/or may be in fluid communication with an external supply of methanol (and/or water).

Liquid leak detection system 160 is schematically illustrated in FIG. 24 and may include any of the components, elements, subelements, and variants described and/or illustrated herein, including the various liquid detectors 162, controllers 164, covers 180, and liquid detection techniques disclosed herein. As discussed herein, in some embodiments, the liquid leak detection system may be configured to be more sensitive to methanol than to water, such as by including a cover or other coating or layer that is hydrophobic or otherwise adapted to repel or resist penetration by water but not methanol. As such, such a (methanol) leak detection system may be adapted to be actuated by at least a predetermined volume of methanol but not to be actuated by an equal volume of water. This is not required to all embodiments. Upon actuation, the (methanol) leak detection system may be adapted to interrupt the operation of the direct methanol fuel cell system, such as by stopping at least the delivery of methanol by feedstock delivery system 22' and/or by isolating the direct methanol fuel cell stack from an applied load, to generate an alert signal, and/or to transition the fuel cell system to a different operating state. This response to actuation of the liquid leak detection system may, but is not required to be, an automated response and may be performed by a controller that forms a part of the leak detection system and/or which is in communication with the leak detection system.

INDUSTRIAL APPLICABILITY

The liquid leak detection systems, and hydrogen-producing fuel processing and fuel cell systems containing the same, that are disclosed herein are applicable to the hydrogen-production industries and to the energy-production industries, including the fuel cell industries.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A fuel processing system with a liquid leak detection system, the fuel processing system comprising:
   a hydrogen-producing assembly with a hydrogen-producing region adapted to receive at least a feed stream containing at least a carbon-containing feedstock and to produce a mixed gas stream containing hydrogen gas as a majority component therefrom;
   a feedstock delivery system adapted to deliver the feed stream containing at least a carbon-containing feedstock to the hydrogen-producing region of the hydrogen-producing assembly, wherein the feedstock delivery system is in communication with a liquid supply containing the carbon-containing feedstock; and
   a liquid leak detection system adapted to detect liquid that leaks from the fuel processing system; wherein the liquid leak detection system comprises:
   a controller;

at least one liquid detector in communication with the controller; wherein the at least one liquid detector includes at least a pair of spaced-apart conductive members, and further wherein the controller is adapted to monitor the at least one liquid detector to electrically detect a property or condition that is indicative of liquid establishing a conductive path between the conductive members; and a cover extending at least above the pair of conductive members and positioned so that liquid leaking from the fuel processing system contacts the cover prior to contacting the pair of conductive members, wherein the cover includes conductive particulate that is configured to be drawn from the cover by liquid passing through the cover to the liquid detector to increase the conductivity of the liquid passing through the cover.

2. The fuel processing system of claim 1, wherein, upon detection of a liquid leak, the liquid leak detection system is adapted to at least one of interrupt the operation of the fuel processing system and cause the feedstock delivery system to stop delivering the feed stream to the hydrogen-producing region.

3. The fuel processing system of claim 1, wherein the liquid leak detection system is adapted to detect liquids having predetermined properties and to not detect liquids having other properties.

4. The libel processing system of claim 1, wherein the liquid leak detection system is adapted to be actuated upon receipt of a predetermined volume of the carbon-containing feedstock from the fuel processing system but not to be actuated by receipt of an equal volume of water.

5. The fuel processing system of claim 1, wherein the liquid leak detection system is adapted to be actuated upon detection of a predetermined volume of the carbon-containing feedstock but not to be actuated upon detection of an equal volume of water.

6. The fuel processing system of claim 1, wherein the at least one liquid detector is adapted to detect a property or condition that is indicative of liquid being present in a region of the fuel processing system where liquid should not be present during proper operation of the fuel processing system.

7. The fuel processing system of claim 1, wherein the at least one liquid detector includes a signal emitter that is adapted to emit a signal, a signal detector that is adapted to detect the signal emitted by the signal emitter, and further wherein the controller is adapted to monitor any detected signal from the signal emitter for a change in the detected signal that is indicative of a liquid leak.

8. The fuel processing system of claim 7, wherein the controller is adapted to monitor any detected signal for an increase in the detected signal that is indicative of a liquid leak.

9. The fuel processing system of claim 7, wherein the signal emitter and the signal detector are formed as electrical traces on a circuit board.

10. The fuel processing system of claim 7, wherein the controller is adapted to compare the detected signal to a threshold value to determine if the detected signal is indicative of a liquid leak.

11. The fuel processing system of claim 10, wherein the controller is in communication with a temperature sensor and is adapted to adjust the threshold value responsive to a detected temperature by the temperature sensor.

12. The fuel processing system of claim 1, wherein the pair of spaced-apart conductive members define a nominally open circuit, and further wherein the controller is adapted to monitor the pair of conductive members to detect a closed circuit established by liquid establishing a conductive path between the conductive members.

13. The fuel processing system of claim 12, wherein the pair of conductive members are separated by a non-conductive material through which liquid may pass.

14. The fuel processing system of claim 1, wherein the cover is adapted to repel water.

15. The fuel processing system of claim 1, wherein the cover is adapted to be more permeable to the carbon-containing feedstock than to water.

16. The fuel processing system of claim 15, wherein the carbon-containing feedstock includes an alcohol, and further wherein the cover is more permeable to the alcohol than to water.

17. The fuel processing system of claim 15, wherein the carbon-containing feedstock includes a hydrocarbon, and further wherein the cover is more permeable to the hydrocarbon than to water.

18. The fuel processing system of claim 1, wherein the cover is shaped to define at least one liquid-pooling region, and further wherein at least one liquid detector is positioned beneath the at least one liquid-pooling region.

19. The fuel processing system of claim 1, wherein at least one of the conductive members extends within the cover.

20. The fuel processing system of claim 1, wherein the pair of conductive members extends beneath the cover.

21. The fuel processing system of claim 1, wherein the conductive members are formed as electrical traces on a circuit board.

22. The fuel processing system of claim 1, wherein the cover includes a liquid-permeable non-conductive barrier through which the conductive particulate may be drawn by the liquid passing through the cover to the liquid detector.

23. A direct methanol fuel cell system, comprising:
    at least one direct methanol fuel cell adapted to produce an electric output from water and liquid methanol;
    a feedstock delivery system adapted to deliver a feed stream containing at least liquid methanol to the at least one direct methanol fuel cell; and
    a liquid leak detection system adapted to detect at least liquid methanol that leaks from the fuel cell system; wherein the liquid leak detection system is adapted to be actuated upon receipt of a predetermined volume of methanol but not to be actuated by receipt of an equal volume of water; wherein the liquid leak detection system comprises:
        a controller;
        at least one liquid detector in communication with the controller and including at least a pair of spaced-apart conductive members, wherein the controller is adapted to monitor the at least one liquid detector to electrically detect a property or condition that is indicative of liquid establishing a conductive path between the conductive members; and
        a cover extending above the at least one liquid detector, wherein the cover is adapted to be more permeable to methanol than to water, wherein the cover includes conductive particulate that is configured to be drawn from the cover by liquid passing through the cover to the liquid detector to increase the conductivity of the liquid passing through the cover.

24. The direct methanol fuel cell system of claim 23, wherein the liquid leak detection system is adapted to be actuated upon detection of a predetermined volume of methanol but not to be actuated upon detection of an equal volume of water.

25. The direct methanol fuel cell system of claim 23, wherein, upon detection of a liquid leak, the liquid leak detection system is adapted to at least one of interrupt the operation of the fuel cell system, cause the feedstock delivery system to stop delivering the feed stream to the at least one direct methanol fuel cell, and generate an alert signal.

26. The direct methanol fuel processing system of claim 23, wherein the controller is adapted to compare a detected signal from the at least one liquid detector to a threshold value to determine if the detected signal is indicative of a liquid leak, and further wherein the controller is in communication with a temperature sensor and is adapted to adjust the threshold value responsive to a detected temperature by the temperature sensor.

27. The direct methanol fuel processing system of claim 23, wherein the conductive members are formed as electrical traces on a circuit board.

28. The direct methanol fuel cell system of claim 23, wherein the cover includes a liquid-permeable non-conductive barrier through which the conductive particulate may be drawn by the liquid passing through the cover to the liquid detector.

29. A fuel processing system with a liquid leak detection system, the fuel processing system comprising:
 a hydrogen-producing assembly with a hydrogen-producing region adapted to receive at least a feed stream containing at least a carbon-containing feedstock and to produce a mixed gas stream containing hydrogen gas as a majority component therefrom;
 a feedstock delivery system adapted to deliver the feed stream containing at least a carbon-containing feedstock to the hydrogen-producing region of the hydrogen-producing assembly, wherein the feedstock delivery system is in communication with a liquid supply containing the carbon-containing feedstock; and
 a liquid leak detection system adapted to detect liquid that leaks from the fuel processing system; wherein the liquid leak detection system is adapted to be actuated upon receipt of a predetermined volume of the carbon-containing feedstock from the fuel processing system but not to be actuated by receipt of an equal volume of water; wherein the liquid leak detection system comprises:
 a controller;
 at least one liquid detector in communication with the controller; wherein the at least one liquid detector includes at least a pair of spaced-apart conductive members formed as electrical traces on a circuit board, wherein the controller is adapted to monitor the at least one liquid detector to electrically detect a property or condition that is indicative of liquid establishing a conductive path between the conductive members; wherein the pair of conductive members includes a signal emitter that is adapted to emit a signal, a signal detector that is adapted to detect the signal emitted by the signal emitter, and further wherein the controller is adapted to monitor any detected signal from the signal emitter for a change in the detected signal that is indicative of a liquid leak; and
 a cover extending at least above the pair of conductive members and positioned so that liquid leaking from the fuel processing system contacts the cover prior to contacting the pair of conductive members; wherein the cover is adapted to be more permeable to the carbon-containing feedstock than to water; and further wherein the cover includes conductive particulate that is configured to be drawn from the cover by liquid passing through the cover to the liquid detector to increase the conductivity of the liquid passing through the cover.

30. The fuel processing system of claim 29, wherein the cover includes a liquid-permeable non-conductive barrier through which the conductive particulate may be drawn by the liquid passing through the cover to the liquid detector.

31. The fuel processing system of claim 29, wherein, upon detection of a liquid leak, the liquid leak detection system is adapted to at least one of interrupt the operation of the fuel processing system and cause the feedstock delivery system to stop delivering the feed stream to the hydrogen-producing region.

32. The fuel processing system of claim 29, wherein the cover is shaped to define at least one liquid-pooling region, and further wherein at least one liquid detector is positioned beneath the at least one liquid-pooling region.

* * * * *

UNITED STATES PATENT AND TRADEMARK OFFICE
CERTIFICATE OF CORRECTION

PATENT NO. : 7,629,067 B2
APPLICATION NO. : 11/750833
DATED : December 8, 2009
INVENTOR(S) : Clint A. Beliveau et al.

It is certified that error appears in the above-identified patent and that said Letters Patent is hereby corrected as shown below:

Column 29,
Line 27, in the phrase "The libel processing system" please delete "libel" and insert -- fuel -- therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,629,067 B2 Page 1 of 1
APPLICATION NO. : 11/750833
DATED : December 8, 2009
INVENTOR(S) : Clint A. Beliveau et al.

It is certified that error appears in the above-identified patent and that said Letters Patent is hereby corrected as shown below:

Column 31,
Line 7, in the phrase "The direct methanol fuel processing system" please delete "processing" and insert -- cell -- therefor.

Column 31,
Line 15, in the phrase "The direct methanol fuel processing system" please delete "processing" and insert -- cell -- therefor.

Signed and Sealed this

Twenty-third Day of March, 2010

David J. Kappos
*Director of the United States Patent and Trademark Office*